(12) United States Patent
Saito

(10) Patent No.: US 12,330,874 B2
(45) Date of Patent: Jun. 17, 2025

(54) PICKING TROLLEY, PICKING SYSTEM, AND PICKING PROGRAM

(71) Applicant: TOYOTA JIDOSHA KABUSHIKI KAISHA, Toyota (JP)

(72) Inventor: Fuminori Saito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 731 days.

(21) Appl. No.: 17/719,698

(22) Filed: Apr. 13, 2022

(65) Prior Publication Data
US 2022/0388777 A1  Dec. 8, 2022

(30) Foreign Application Priority Data
Jun. 7, 2021 (JP) .................. 2021-094840

(51) Int. Cl.
   *B65G 1/137* (2006.01)
(52) U.S. Cl.
   CPC .................. *B65G 1/1375* (2013.01)
(58) Field of Classification Search
   CPC .................................................. B65G 1/1375
   See application file for complete search history.

(56) References Cited

U.S. PATENT DOCUMENTS

| | | | | |
|---|---|---|---|---|
| 5,877,962 A * | 3/1999 | Radcliffe | ............ | G06Q 10/087 705/28 |
| 2004/0153207 A1* | 8/2004 | Peck | .................. | B65G 1/1373 700/214 |
| 2010/0057245 A1 | 3/2010 | Hironaka et al. | | |
| 2016/0300179 A1* | 10/2016 | Aviles | ................. | G02B 27/017 |
| 2018/0353869 A1* | 12/2018 | Corkin | .................... | A63H 5/00 |
| 2019/0300284 A1* | 10/2019 | Peck | ...................... | B65G 1/065 |
| 2021/0031365 A1* | 2/2021 | Demirdjian | ............. | B25J 9/163 |
| 2021/0047120 A1* | 2/2021 | Gong | .................. | B65G 1/1376 |
| 2021/0221616 A1* | 7/2021 | Fuentes | ................. | G05B 15/02 |

FOREIGN PATENT DOCUMENTS

| | | |
|---|---|---|
| JP | 2004-224508 A | 8/2004 |
| JP | 2010-052845 A | 3/2010 |
| JP | 2010-280468 A | 12/2010 |
| JP | 2016-132529 A | 7/2016 |

* cited by examiner

*Primary Examiner* — Kyle O Logan
(74) *Attorney, Agent, or Firm* — Oliff PLC

(57) ABSTRACT

A picking trolley includes a storage shelf portion on which a storage portion is placed, an inspection table, an imaging unit, a reading unit, a storage unit, a processing unit that generates inspection result information indicating whether an inspection target article corresponds to a picking article, and a display unit. The inspection result information includes inspection number information obtained by counting, as the picking article, the inspection target article including article information matching article information of the picking article. The processing unit determines that picking is completed when there is no inspection failure article that is the inspection target article including article information that does not match the article information of the picking article, there is no undecipherable article that is the inspection target article including article information that is unable to be read normally, and the inspection number information and the instruction number information match.

15 Claims, 17 Drawing Sheets

| PLEASE GO TO INSTRUCTED LOCATION AND READ CODE | ORDER 10/30 |
| --- | --- |
| | LOCATION XX-XX-XX |
| | ARTICLE NUMBER XXXXX-XXXXX |
| | INSTRUCTION NUMBER: 3  INSPECTION NUMBER: 0 |
| | STORAGE DESTINATION: A C / B D |

FIG. 13

| PICKING COMPLETED | ORDER | 10/30 |

LOCATION
XX-XX-XX

ARTICLE NUMBER
XXXXX-XXXXX

INSTRUC-TION NUMBER: 3
INSPEC-TION NUMBER: 3

STORAGE DESTINATION

| A | C |
| B | D |

| THERE IS INSPECTION FAILURE ARTICLE || ORDER | 10/30 |
|---|---|---|---|
| LOCATION | ARTICLE NUMBER | LOCATION | |
| ZZ-ZZ-ZZ | ZZZZZ-ZZZZZ | XX-XX-XX | |

ARTICLE NUMBER: XXXXX-XXXXX

INSTRUCTION NUMBER: 3　INSPECTION NUMBER: 2

STORAGE DESTINATION:

| A | C |
|---|---|
| B | D |

PICKING TROLLEY, PICKING SYSTEM, AND PICKING PROGRAM

CROSS-REFERENCE TO RELATED APPLICATION

This application claims priority to Japanese Patent Application No. 2021-094840 filed on Jun. 7, 2021, incorporated herein by reference in its entirety.

BACKGROUND

1. Technical Field

The present disclosure relates to a picking trolley, a picking system, and a picking program.

2. Description of Related Art

For picking operation (collection operation or sorting operation) carried out in a warehouse, a distribution center, a factory, or the like, for example, a picking trolley capable of counting, collecting, distributing, and transporting articles is used.

Japanese Unexamined Patent Application Publication No. 2010-52845 (JP 2010-52845 A) discloses a picking trolley and a picking system including a pedestal portion, a plurality of storage shelf portions, a display unit, a sensor unit, and a determination unit. The pedestal portion has wheels on the lower surface. The storage shelf portions are provided above the pedestal portion. A storage box for sorting and storing articles is assigned to at least one of the storage shelf portions and placed to be able to be taken in and out. The display unit displays at least an article to be sorted and a storage shelf portion that is the sorting destination of the article. The sensor unit detects whether the storage box has been pulled out for each storage shelf portion on which the storage box is placed. The determination unit determines whether the storage shelf portion from which the storage box has been pulled out and the storage shelf portion displayed on the display unit match based on the detection result of the sensor unit.

SUMMARY

However, in the technique described in JP 2010-52845 A, the article information given to each article is read by using a scanner. Therefore, a heavy burden is imposed on the operator especially when it is necessary to scan a large amount of articles, and there is an issue that a counting error may occur due to scan omissions, multiple scans, and the like.

The present disclosure has been made to solve such an issue, and an object of the present disclosure is to provide an efficient picking trolley, an efficient picking system, and an efficient picking program capable of suppressing counting errors.

A picking trolley according to an embodiment includes: a storage shelf portion on which a storage portion for storing a picking article is placed; an inspection table on which at least one inspection target article is temporarily placed; an imaging unit that captures an image of the inspection target article placed on the inspection table and generates image information; a reading unit that reads article information that specifies the inspection target article from the image information; a storage unit that stores picking instruction information including the article information that specifies the picking article and instruction number information that indicates a quantity of the picking article to be picked; a processing unit that collates the article information of the inspection target article with the article information of the picking article read from the storage unit and generates inspection result information indicating whether the inspection target article corresponds to the picking article; and a display unit that displays the picking instruction information, the image information, and the inspection result information. The inspection result information includes inspection number information obtained by counting, as the picking article, the inspection target article including the article information matching the article information of the picking article. The processing unit determines that picking is completed when there is no inspection failure article that is the inspection target article including article information that does not match the article information of the picking article, there is no undecipherable article that is the inspection target article including article information that is unable to be read normally, and the inspection number information and the instruction number information match.

A picking system according to an embodiment includes: a storage shelf portion on which a storage portion for storing a picking article is placed; an inspection table on which at least one inspection target article is temporarily placed; an imaging unit that captures an image of the inspection target article placed on the inspection table and generates image information; a reading unit that reads article information that specifies an article from the image information; a storage unit that stores picking instruction information including the article information that specifies the picking article and instruction number information that indicates a quantity of the picking article to be picked; a processing unit that collates the article information of the inspection target article with the article information of the picking article read from the storage unit and generates inspection result information indicating whether the inspection target article corresponds to the picking article; and a display unit that displays the picking instruction information, the image information, and the inspection result information. The inspection result information includes inspection number information obtained by counting, as the picking article, the inspection target article including the article information matching the article information of the picking article. The processing unit determines that picking is completed when there is no inspection failure article that is the inspection target article including article information that does not match the article information of the picking article, there is no undecipherable article that is the inspection target article including article information that is unable to be read normally, and the inspection number information and the instruction number information match.

A picking program according to an embodiment includes: a storing step for storing, by a storage unit, picking instruction information including article information that specifies a picking article and instruction number information that indicates a quantity of the picking article to be picked; an instructing step for displaying the picking instruction information on a display unit; an imaging step for generating image information by an imaging unit that captures an image of at least one inspection target article placed on an inspection table; a reading step for reading article information that specifies the inspection target article from the image information: an inspection processing step for collating the article information of the inspection target article with the article information of the picking article read from the storage unit and generating inspection result information indicating whether the inspection target article corresponds to the picking article; and a displaying step for displaying the inspection result information on the display unit together with the image information. The inspection result information includes inspection number information obtained by counting, as the picking article, the inspection target article including the article information matching the article information of the picking article. In the inspection processing step, a computer is caused to execute a process of determining that picking is completed when there is no inspection failure article that is the inspection target article including article information that does not match the article information of the picking article, there is no undecipherable article that is the inspection target article including article information that is unable to be read normally, and the inspection number information and the instruction number information match.

The present disclosure can provide an efficient picking trolley, an efficient picking system, and an efficient picking program capable of suppressing counting errors.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a diagram showing a screen example of a display unit at the start of the picking operation;

FIG. 13 is a diagram showing a screen example of the display unit when a storage portion is opened after the inspection is completed;

FIG. 14 is a diagram showing a screen example of the display unit when there is an excess of the picking articles;

FIG. 15 is a diagram showing a screen example of the display unit when there is an inspection failure article;

DETAILED DESCRIPTION OF EMBODIMENTS

First Embodiment

Hereinafter, embodiments of the present disclosure will be described below with reference to the drawings. However, the present disclosure is not limited to the following embodiments. Further, in order to clarify the explanation, the following description and drawings are simplified as appropriate. What is shown in the figures is a part of the whole, and the configurations actually include many other configurations that are not shown. Further, in the following description, the same or equivalent elements are designated by the same reference signs, and duplicate description will be omitted.

A picking trolley 1 according to the present embodiment can be used for picking operation carried out in, for example, a warehouse, a distribution center, a factory, or the like. The present embodiment illustrates and describes the picking operation in which an operator performing the picking operation takes out an article stored on a shelf and stores the article in a designated storage portion 10 of the picking trolley 1 to deliver the article (picking article W1).

In the following description, an article having article information specified by picking instruction information is referred to as a picking article W1. On the other hand, an article having article information not specified by the picking instruction information is an article of a different type from the picking article W1 and is referred to as an inspection failure article W2. That is, the picking article W1 and the inspection failure article W2 have different article information. An article placed on an inspection table 30 and subjected to inspection using the picking trolley 1, the picking system, and the picking program according to the present embodiment is referred to as an inspection target article W. Further, an article having article information that cannot be read normally using image information is referred to as an undecipherable article W3.

When the picking article W1, the inspection failure article W2, the inspection target article W, and the undecipherable article W3 are not particularly distinguished, the article may be collectively referred to as an article. Further, for convenience of description, when distinguishing each of the article information for specifying the article, the article information of the article stored in a storage unit 62 is referred to as "article management information", and the article information read from a code C1 is referred to as "article identifier information".

Figure 1:
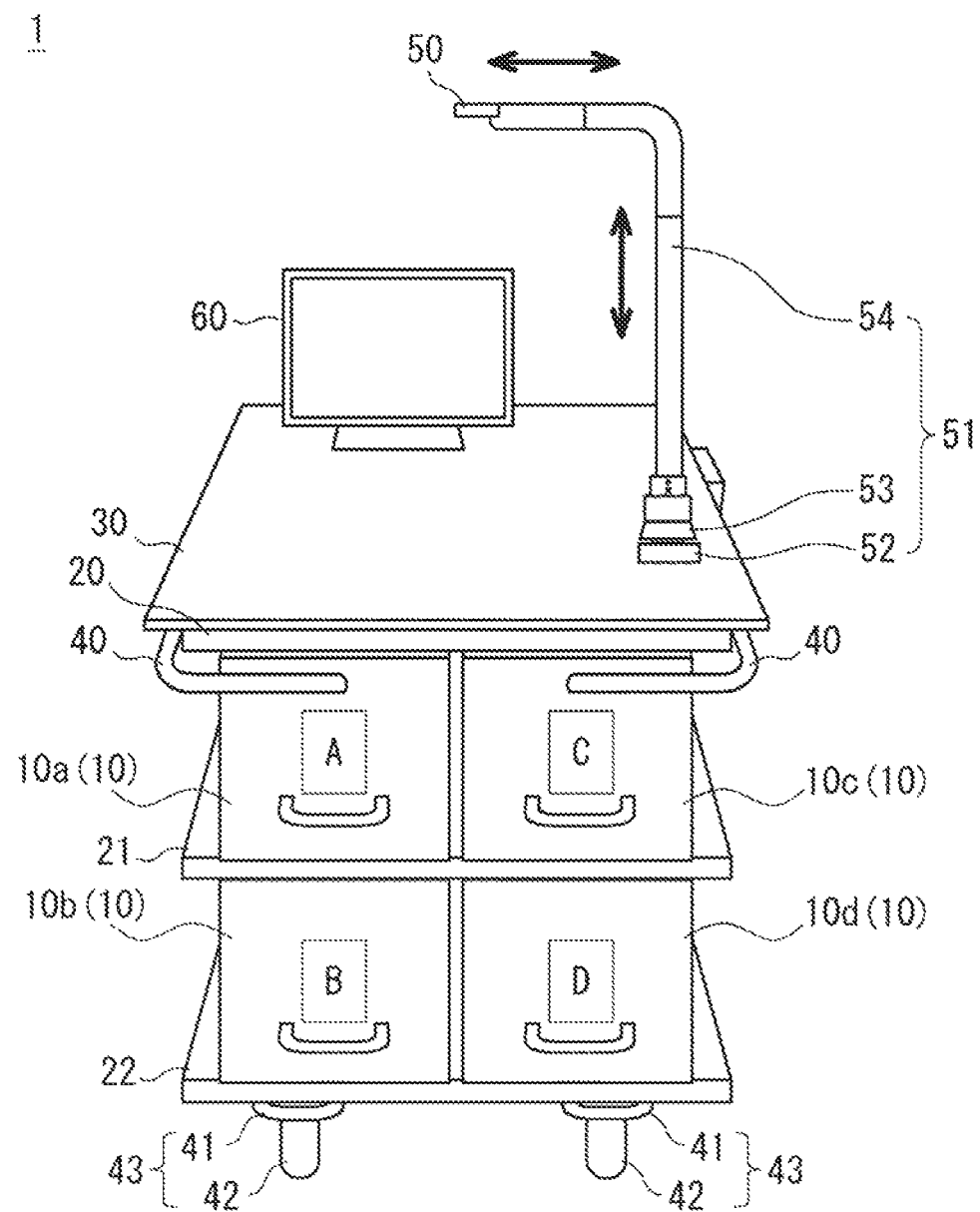
FIG. 1 is an external view showing a picking trolley according to a first embodiment.
Figure 2:
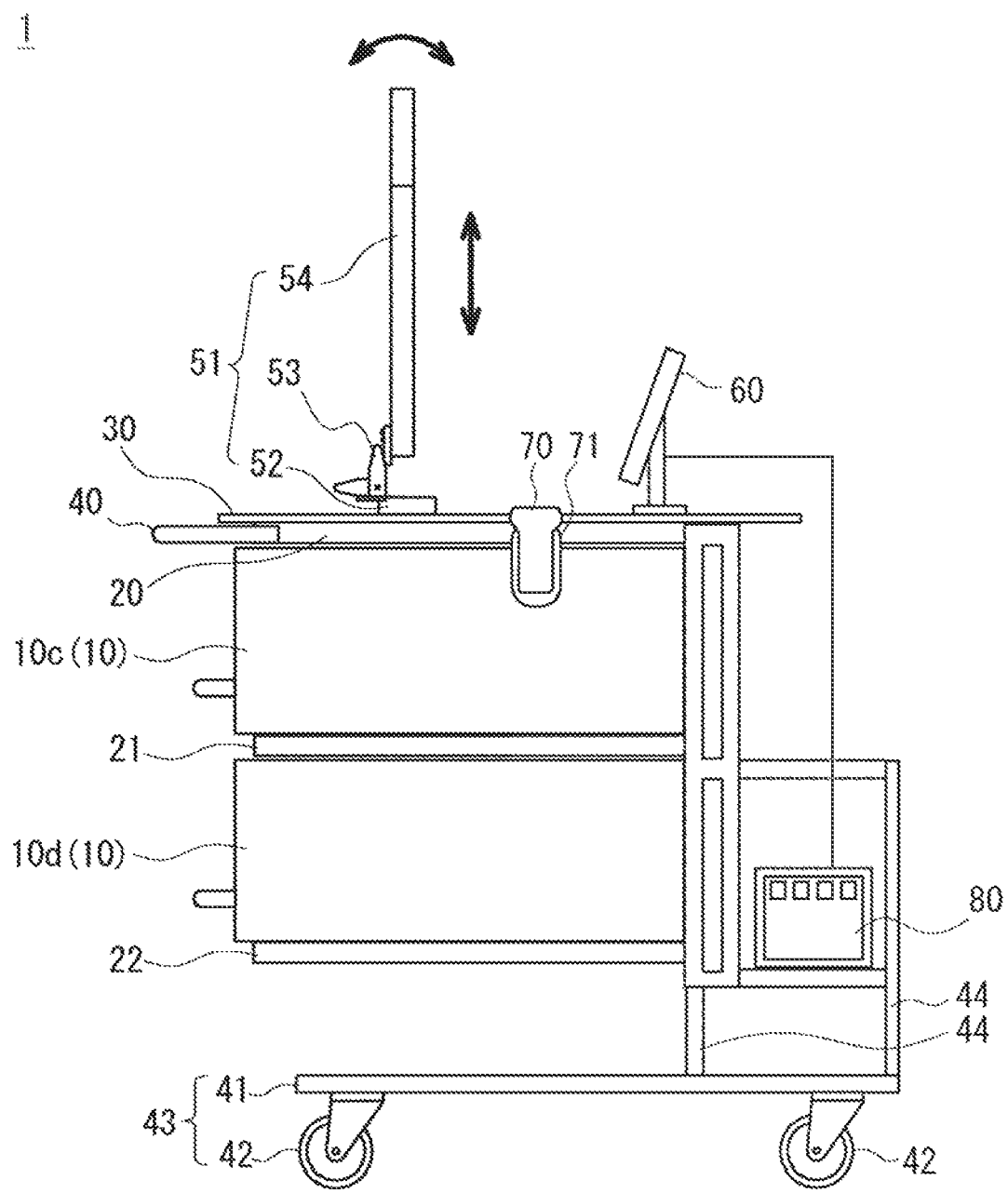
FIG. 2 is a side view of the picking trolley shown in FIG. 1.

First, the outline of the picking trolley 1 will be described with reference to FIGS. 1 and 2. FIG. 1 is an external view showing a picking trolley according to a first embodiment. FIG. 2 is a side view of the picking trolley shown in FIG. 1.

As shown in FIGS. 1 and 2, the picking trolley 1 includes a pedestal portion 43, storage shelf portions 21 and 22, the inspection table 30, handles 40, an imaging unit 50, an imaging movable unit 51, a terminal 60, and a scanner unit 70.

The pedestal portion 43 has a bottom frame 41 arranged at the bottom of the picking trolley 1 and wheels 42 on the lower surface of the bottom frame 41. Two-tier upper and lower storage shelf portions 21 and 22 are provided above the pedestal portion 43. The storage shelf portions 21 and 22 are shelves provided in a substantially rectangular shape on which the storage portions 10a and 10c or the storage portions 10b and 10d can be placed. The storage shelf portion 21 is arranged in the upper tier, and the storage shelf portion 22 is arranged in the lower tier.

The storage portions 10a and 10c are placed side by side on the storage shelf portion 21. The storage portions 10b and 10d are placed side by side on the storage shelf portion 22. The storage portions 10a to 10d are boxes in which the picking article W1 is stored, and the picking article W1 is sorted by an operator into any one of the storage portions 10a to 10d. Hereinafter, when it is not necessary to particularly distinguish the storage portions 10a to 10d, the individual storage portions 10a to 10d will be described as the storage portion 10.

The operator pulls out the storage portion 10 by pulling a handle provided on the front side of the designated storage portion 10 (any one of the storage portions 10a to 10d) and puts in the picking article W1 that has been inspected to store the picking article W1 in the storage portion 10. In the present embodiment, a case where the picking trolley 1 has two-tier upper and lower storage shelf portions 21 and 22 and four storage portions 10 will be described by way of example, but the arrangement, quantity, etc. of each component are not limited to this.

The storage shelf portions 21 and 22 are each provided with a detection unit for detecting whether the storage portion 10 has been opened or closed. The detection unit is connected to a communication unit 61 of the terminal 60. The detection unit is, for example, an optical sensor or a magnetic sensor, and is provided at the front end portion or the rear end portion of the storage shelf portions 21 and 22. The detection unit detects that the storage portion 10 has been opened and closed, and transmits the detection result to the terminal 60.

A top surface portion 20 having a substantially rectangular shape is provided on the uppermost tier above the storage shelf portion 21. The storage shelf portions 21 and 22 and the top surface portion 20 are supported by a support frame 44 erected on the bottom frame 41.

The top surface portion 20 is provided with a pair of right and left handles 40 extending from the sides to the front. The operator can stand on the front side of the picking trolley 1, hold the handles 40, and push the picking trolley 1 by hand to move the picking trolley 1 to a desired place.

The inspection table 30 is provided on the upper surface of the top surface portion 20. The inspection table 30 has a flat plate shape. A space on which a plurality of inspection target articles W can be placed is provided on the upper surface of the inspection table 30. The operator places the article taken out from the shelf in the space on the inspection table 30. The article placed on the inspection table 30 is the inspection target article W.

The imaging unit 50 is provided on the inspection table 30 via the imaging movable unit 51. The imaging movable unit 51 is a camera support arm that gives the imaging unit 50 one or more degrees of freedom. The imaging movable unit 51 includes a fixing member 52, a hinge 53, and an arm 54. The hinge 53 is provided on the inspection table 30 via the fixing member 52 fixed on the inspection table 30. The hinge 53 is connected to the base end of the arm 54, which is a rod-shaped member having a substantially L shape. The imaging unit 50 is attached to the tip of the arm 54. The arm 54 is rotatable on the inspection table 30 so that its tip draws an arc around a horizontal axis. The arm 54 is also configured such that the distal end side and the base end side can each be expanded and contracted in the extending direction.

For example, in the case of the picking trolley 1 shown in FIG. 1, the imaging movable unit 51 is arranged on the right peripheral edge of the inspection table 30 when viewed from the front side where the operator stands. The base end side of the arm 54 extends vertically upward, and the tip end side of the arm 54 extends inward from the right peripheral edge of the inspection table 30 along the width direction of the inspection table 30. The operator can tilt the imaging movable unit 51 toward the front side and the back side from the state in which the imaging movable unit 51 is erected in the vertical direction. As a result, the inspection target article W placed on the inspection table 30 can be imaged from various angles. Further, the operator can adjust the position of the imaging unit 50 in the width direction of the inspection table 30 by adjusting the expansion and contraction of the tip end side of the arm 54. The operator can also change the length of the arm 54 by adjusting the expansion and contraction of the base end side of the arm 54. As a result, it is possible to secure an appropriate distance between the inspection target article W placed on the inspection table 30 and the imaging unit 50.

The imaging unit 50 is, for example, a camera having an optical system such as a lens and an image sensor. The imaging unit 50 is installed so as to capture an image of the space on the inspection table 30. The imaging unit 50 captures an image of at least one inspection target article W placed on the inspection table 30 and generates image information. Attribute data such as the imaging date and time is added to the image information. The imaging unit 50 transmits the generated image information to the terminal 60.

The image information generated by the imaging unit 50 may be a moving image, or may be a plurality of continuous still images captured at intervals specified in advance. The image information can be considered as at least one frame image constituting the moving image. The plurality of frame images may or may not be continuous. For example, the frame images may be a plurality of frame images acquired by a predetermined number of discontinuous frame images.

Here, in the present embodiment, the codes C1 are given to the articles stored on the shelves in advance. In the present embodiment, the code C1 is a bar code, which is printed on a label or the like and attached to the surface of the inspection target article W, but the type of the code C1 and the way the code C1 is given are not limited to this. In addition to a one-dimensional code including a barcode, the code C1 may be a two-dimensional code including a QR code (registered trademark), a color code, a character string, a number string, or the like, and these may be used in combination. The code C1 is not limited to these as long as the code C1 can be identified in the image analysis processing using the image information generated by the imaging unit 50. It is preferable that the code C1 can be identified by scanning with the scanner unit 70.

The article identifier information read from the code C1 is associated with article management information for specifying the inspection target article W stored in the storage unit 62. The article identifier information and the article management information are article information for specifying an article, and are, for example, information indicating an article number, an article name, a size, a shape, a color, and the like. The article information is not limited to these as long as the article information can specify the type of the article. The present embodiment illustrates and describes the case where the article number is used as the article information.

In addition to the barcode, the article number or the like represented by at least one of a character string and a number string is printed on the label. Therefore, the operator can also confirm the article identifier information of the inspection target article W by visually observing the character string or the number string printed on the label.

The scanner unit 70 of the picking trolley 1 is a handy scanner such as a bar code reader that can optically read the code C1. The scanner unit 70 is held by the picking trolley 1 by a holder 71 provided on the side portion of the top surface portion 20. When reading the code C1, for example, the operator removes the scanner unit 70 from the holder 71 to use the scanner unit 70. The operator brings the scanner unit 70 close to the code C1 so that the code C1 of the inspection target article W to be read is within the reading range of the scanner unit 70, to input the article identifier information of the code C1 and transmit the article identifier information to the communication unit 61 of the terminal 60.

The terminal 60 is a computer installed on the inspection table 30 and used by the operator. The terminal 60 is connected to and driven by a power supply unit 80 composed of a battery or the like arranged on the back side of the storage portions 10b and 10d. The terminal 60 is, for example, a personal computer (PC), a tablet PC, a smartphone, or the like. The present embodiment illustrates and describes a case where a tablet PC provided with a touch panel type display is used. The display constitutes a display unit 63 of the terminal 60, and is, for example, a liquid crystal display (LCD), an organic electro-luminance (EL) display, or the like.

Figure 3:
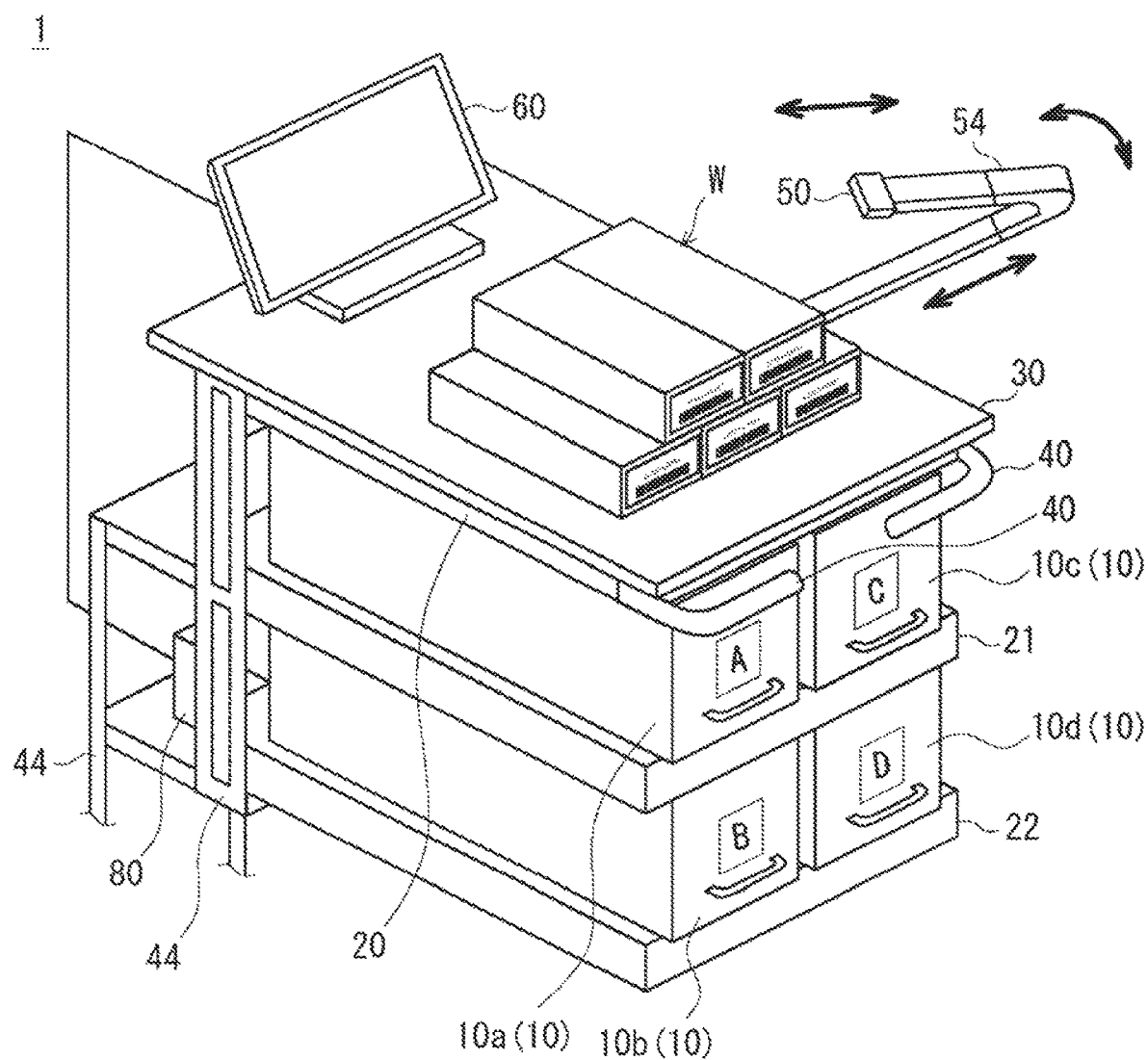
FIG. 3 is a perspective view showing an example of a state in which an imaging unit of the picking trolley shown in FIG. 1 is moved to read article identifier information of an inspection target article.

Subsequently, with reference to FIG. 3, the position adjustment of the imaging unit 50 performed for appropriately reading the code C1 of the inspection target article W will be described with reference to a specific example. FIG. 3 is a perspective view showing an example of a state in which the imaging unit of the picking trolley shown in FIG. 1 is moved to read the article identifier information of the inspection target article. In FIG. 3, the pedestal portion 43 is not shown.

As shown in FIG. 3, a plurality of inspection target articles W is placed on the inspection table 30. The inspection target articles W on the inspection table 30 are articles taken out from the shelf by an operator, placed on the inspection table 30, and stacked. In the example shown in FIG. 3, the codes C1 printed on the labels are attached to the side surfaces of the inspection target articles W, and the codes C1 face the front side of the picking trolley 1 to be perpendicular to the upper surface of the inspection table 30.

As described above, the imaging unit 50 of the picking trolley 1 is attached to the imaging movable unit 51. Therefore, the imaging unit 50 is configured to be movable in the space on the inspection table 30 with one or more degrees of freedom. Therefore, the operator can change the imaging direction and the imaging position of the imaging unit 50 by appropriately adjusting the rotation angle and expansion and contraction of the arm 54 of the imaging movable unit 51. As a result, even when the codes C1 given to the inspection target articles W are in a state parallel to, perpendicular to, or tilted with respect to the upper surface of the inspection table 30, the codes C1 can be easily read by the imaging unit 50.

As shown in FIG. 3, when the codes C1 face the front side of the picking trolley 1, the operator tilts the arm 54 of the imaging movable unit 51 toward the front side and adjusts the expansion and contraction of the arm 54. The operator adjusts the position to change the imaging direction and imaging position of the imaging unit 50 so that each code C1 of all the inspection target articles W placed on the inspection table 30 is within the imaging range of the imaging unit 50. The image information acquired in this way includes at least each code C1 of all the inspection target articles W placed on the inspection table 30.

Further, for example, when the code C1 is difficult to read due to reflection of light such as lighting, the operator can move the imaging unit 50 to the optimum imaging direction and imaging position for reading the code C1. In addition to such a configuration, in order to read the code C1 satisfactorily, it is also possible to adopt a method of providing a light diffusion sheet above the inspection table 30 to suppress light reflection during imaging.

Figure 4:
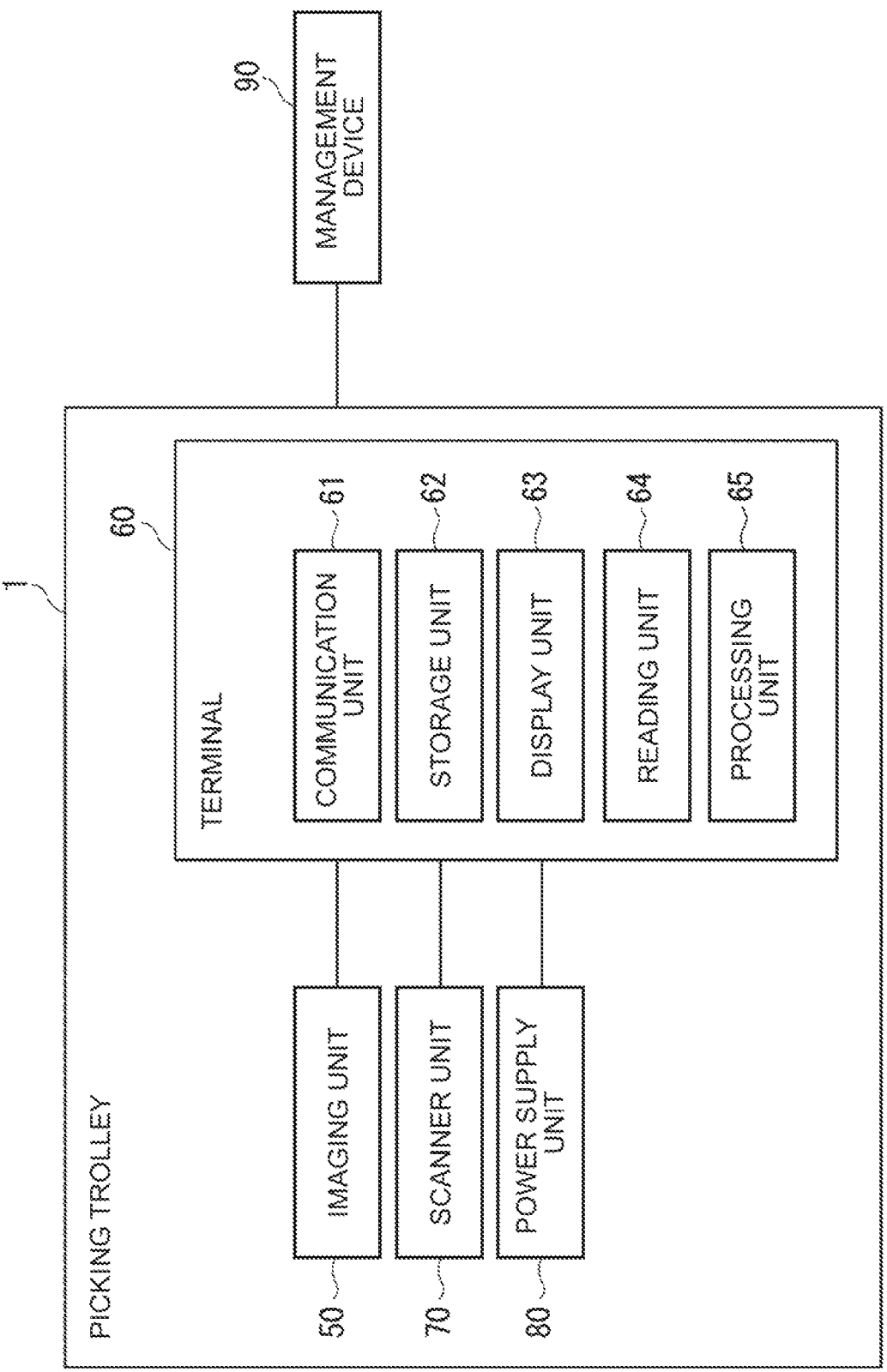
FIG. 4 is a functional block diagram of a picking system according to the first embodiment.

Next, a picking system configured by using the above-mentioned picking trolley 1 will be described with reference to FIG. 4. FIG. 4 is a functional block diagram of the picking system according to the first embodiment. As shown in FIG. 4, the picking system according to the present embodiment is mainly composed of a management device 90 for managing the picking operation and the picking trolley 1.

The management device 90 is, for example, a server. The management device 90 is communicatively connected to the communication unit 61 of the terminal 60 via a network. The management device 90 is a computer that gives an instruction to an operator for the picking operation via the terminal 60. The management device 90 generates the picking instruction information for controlling the picking operation based on the picking order input from the outside (for example, an operation instructor or the like).

For example, one cycle of the picking instruction information includes at least one order. Each picking instruction information is given a cycle number for identifying the picking instruction information. When a plurality of orders is included in one cycle, the location, the picking article W1, the number of instructions, and the storage destination are specified for each order. The picking instruction information includes, for example, an article data table, order information, location information, picking article information, instruction number information, and storage destination information. The picking instruction information may include delivery destination information for designating the delivery destination, trolley information for designating the picking trolley 1, operator identification information for designating an operator, and the like.

The article data table includes article management information that specifies the picking article W1. The article data table also includes, for example, article management information of an article other than the picking article W1 existing in the warehouse. The article other than the picking article W1 is the inspection failure article W2 having article information not specified by the picking instruction information.

The order information includes, for example, order total quantity information indicating the total quantity of orders contained in one cycle, and order remaining quantity information indicating the remaining quantity of orders contained in one cycle. The location information, the picking article information, the instruction number information, and the storage destination information are set individually for each order, thereby determining the instruction content of each order. The instruction content of each order may be the same instruction content or different instruction content.

The location information is information indicating a storage location of the picking article W1 in the warehouse. The picking article information is information indicating the article management information of the picking article W1. The instruction number information is information indicating the quantity of the picking article W1 to be picked.

The terminal 60 installed on the picking trolley 1 includes the communication unit 61, the storage unit 62, the display unit 63, a reading unit 64, and a processing unit 65. Each of these functional blocks is electrically connected to each other through a common bus. Further, the terminal 60 includes a control unit that executes a program for realizing the function of each functional block via the bus. The control unit is realized by a central processing unit (CPU), a read-only memory (ROM), a random access memory (RAM), an input/output (I/O) port, and the like.

The control unit reads and executes a program stored in the storage unit 62. As a result, the function of each functional block is realized. The control unit may execute the program while accessing the storage unit 62. It should be noted that these functional blocks may be realized by a single terminal device, or may be realized by using a plurality of terminal devices connected by connection means such as a network.

The communication unit 61 is an input/output port or the like. The communication unit 61 connects the terminal 60 to the network and communicates with each of the management device 90, the imaging unit 50, and the scanner unit 70. The terminal 60 transmits and receives various programs and various types of information to and from each of the management device 90, the imaging unit 50, and the scanner unit 70 via the communication unit 61. The network may be wireless or wired, and includes, for example, a wireless local area network (LAN) such as WiFi (registered trademark), the Internet, a mobile communication network, and the like. In the present embodiment, the terminal 60 is preferably connected to a wireless network.

The storage unit 62 is a memory such as a ROM or RAM, and may include a non-volatile memory. For example, the ROM stores various programs and the like to be executed in the control unit. For example, the RAM stores various types of information read by the control unit, various types of information input to the display unit 63, and the like. Various programs and various types of information stored in the storage unit 62 can be transmitted to and received from an external device via the communication unit 61. The program stored in the storage unit 62 includes a picking program that causes the control unit to execute the processes shown in FIGS. 5 to 7.

The display unit 63 outputs the picking instruction information, the image information, inspection result information received from the processing unit 65, etc. that have been received by the communication unit 61, and displays the information on the display. The display unit 63 notifies the operator of the instruction, progress, and result of the picking operation by displaying these information individually or in combination. The display unit 63 also includes an audio output device such as a speaker. It is preferable that the notification to the operator is given by voice together with the display on the display. The operator performs the picking operation while confirming the instruction, progress, and result of the picking operation on the display unit 63.

The display unit 63 also includes various input devices such as a touch panel and a microphone for receiving input from the operator. For example, the operator can input the operation information on the operator side into the inside of the terminal 60 by touching the input button displayed on the display unit 63.

The input button is, for example, a "Continue" button, a touch keyboard for inputting characters and numbers, and the like. The "Continue" button is used when an image of a plurality of the inspection target articles W corresponding to the instruction number cannot be captured at once (when one image information cannot include all codes C1), to capture images of the inspection target articles W in several different groups so that the codes C1 are read dividedly.

Hereinafter, performing the reading of the code C1 dividedly is referred to as a divided scan. In performing the divided scan, when the operator touches the "Continue" button, the cumulative inspection result information obtained from all the article identifier information included in the plurality of types of the image information can be generated.

The operator can also input the operation information on the operator side to the terminal 60 by voice. The terminal 60 executes various processes based on the input operation information. The input device may be configured by a keyboard, a mouse, or the like.

The reading unit 64 performs image analysis processing on the image information received from the imaging unit 50. The acquisition of the article identifier information by the reading unit 64 is started at the timing when the inspection target article W is arranged within the imaging range of the imaging unit 50. That is, the reading unit 64 is configured to acquire the article identifier information when the reading unit 64 captures a change of a predetermined amount or more of the image information received from the imaging unit 50.

The reading unit 64 has a function of detecting the code C1 from the image information and reading the article identifier information for identifying the detected code C1. The reading unit 64 can simultaneously detect a plurality of the codes C1 included in the image information and can simultaneously read a plurality of types of the article identifier information. Then, the reading unit 64 transmits the read article identifier information to the processing unit 65.

The processing unit 65 has a function of collating the article identifier information of the inspection target article W with the article management information of the picking article W1 read from the storage unit 62, and generating the inspection result information indicating whether the inspection target article W corresponds to the picking article W1. In generating the inspection result information, the processing unit 65 receives the article identifier information from the reading unit 64. The processing unit 65 may receive the article identifier information read by the scanner unit 70, or may receive the article identifier information manually input by the operator via the input button on the touch panel.

The processing unit 65 that has acquired the article identifier information searches for and reads the article management information that matches the article identifier information of the inspection target article W from the article data table stored in the storage unit 62. Then, the processing unit 65 generates the inspection result information upon determining the type of the inspection target article W based on the result of collating the article identifier information of the inspection target article W and the article management information read from the storage unit 62, and transmits the generated inspection result information to the display unit 63.

When the inspection target article W is the picking article W1, the article identifier information of the inspection target article W matches the article management information of the picking target article. In this case, the processing unit 65 includes information indicating that the inspection target article W corresponds to the picking article W1 in the inspection result information. At the same time, the processing unit 65 counts (performs number inspection of) the inspection target article W as the picking article W1 and includes inspection number information corresponding to the counted total number in the inspection result information.

When the inspection target article W is the inspection failure article W2, the article identifier information of the inspection target article W does not match the article management information of the picking article W1, and matches the article management information of the inspection failure article W2. In this case, the processing unit 65 includes information indicating that the inspection target article W corresponds to the inspection failure article W2 in the inspection result information.

Further, when the code C1 given to the inspection target article W is deformed, missing, or the like and the code C1 cannot be read normally from the image information, the processing unit 65 includes information indicating that the inspection target article W corresponds to an undecipherable article W3 in the inspection result information. Regarding the undecipherable article W3, for example, when the article identifier information of the inspection target article W does not match either the article management information of the picking article W1 or the article management information of the inspection failure article W2 as a result of searching the article management information, the processing unit 65 may be caused to recognize that the inspection target article W is an undecipherable article W3 that does not correspond to the picking article W1 nor the inspection failure article W2. For example, even when the article identifier information cannot be recognized due to deformation, loss, or the like of at least a part of the code C1, the article is recognized as an undecipherable article W3.

The inspection result information generated in this way includes the inspection number information obtained by counting the inspection target article W as the picking article W1, total number information indicating the total number of acquired article identifier information, and various markers indicating the type of the inspection target article W. As the inspection number information, the total number counted as the picking article W1 is displayed on the display unit 63. The total number information is information indicating the total number of article identifier information read by the reading unit 64 regardless of the type of the inspection target article W. As a marker display method, there is a method of superimposing various markers at a position related to the specified inspection target article W in the image information, for example, at a position overlapping each code C1 to be displayed on the display unit 63. As a result, the operator can easily grasp the type of the inspection target article W existing at the position where the marker is displayed.

As the form of the marker, it is conceivable to change the shape and color of the marker according to the type of the specified inspection target article W. The form of the marker is preferably a form in which the operator can visually determine the type of the inspection target article W with the marker. As another example of the form of the marker, the color of the marker of the picking article W1 may be switched according to the inspection state described later. The marker may be a symbol such as a character or an arrow.

In the present embodiment, as an example of changing the shape and color of the marker according to the type of the specified inspection target article W, a first marker M1 corresponding to the picking article W1 is a gray circle, a second marker M2 corresponding to the inspection failure article W2 is a red circle, and a third marker M3 corresponding to the undecipherable article W3 is a red cross. Further, it is preferable that the color of the first marker M1 is switched according to the inspection state described later.

In the present embodiment, the first marker M1 is gray when the inspection state is not completed, and switches to green when the inspection state is completed.

Such a marker can be configured to display one of the first marker M1, the second marker M2, and the third marker M3, or a combination thereof. For example, when one type of the marker is used, it is preferable that the first marker M1 is displayed.

In addition to the inspection number information, the total number information, and the marker, the inspection result information can include various types of information such as, for example, a text message, a color change in a frame displaying quantity or the like, a voice output, and the like, and thus the operator can be notified of the inspection result. The inspection result information may be displayed by superimposing the inspection result information on the image information, may be displayed by directly processing the corresponding part of the image information without superimposing the inspection result information on the image information, or may be displayed in combination thereof.

The processing unit 65 determines that the picking is completed when there is no inspection target article W other than the picking article W1 and the inspection number information and the instruction number information match, and performs processing for changing the inspection state from incomplete to complete. At this time, all of the one or more types of the article identifier information acquired by the processing unit 65 matches the article identifier information of the picking article W1.

The fact that there is no inspection target article W other than the picking article W1 means that there is no article identifier information matching the article management information of the inspection failure article W2 and there is no article identifier that is undecipherable in the article identifier information acquired by the processing unit 65. That is, the above means that only the picking article W1 is placed on the inspection table 30, and the inspection failure article W2 and the undecipherable article W3 are not placed.

Further, when at least one of the following conditions are satisfied after the processing unit 65 sets the inspection state to complete: a condition that the inspection number information recognized by the processing unit 65 exceeds the instruction number information (the inspection number exceeds the instruction number); and a condition that the processing unit 65 recognizes the inspection failure article W2, the processing unit 65 redetermines that the picking is incomplete, and performs processing of returning the inspection state from complete to incomplete. Such an OR operation is performed after the inspection state is set to complete and before the picking article W1 is stored in the storage portion 10.

For example, after the inspection state is set to complete, the picking article W1 is stored in the storage portion 10, so that the picking article W1 is removed from the inspection table 30 by the operator. In this way, as the picking article W1 is removed from the inspection table 30, the processing unit 65 subtracts the quantity of the reduced article identifier information from the total number and updates the total number information. Therefore, the processing unit 65 maintains the inspection state to complete when the updated total number information decreases from the total number information before the update, while the processing unit 65 performs a process to return the inspection state to incomplete when the updated total number information increases from the total number information before the update.

Figure 5:
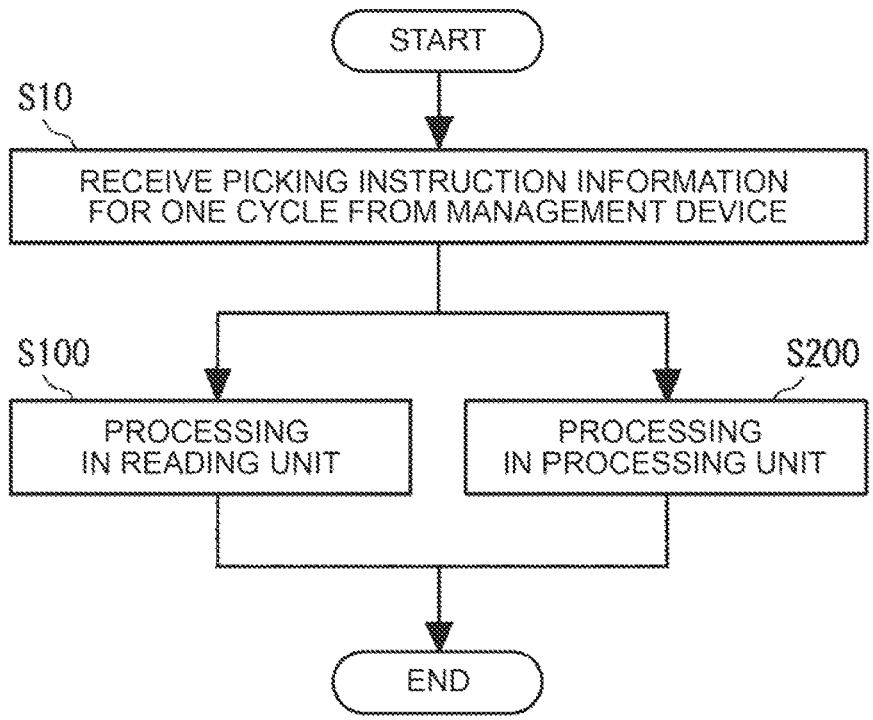
FIG. 5 is a flowchart showing an example of processing in the picking system according to the first embodiment.

Next, with reference to FIG. 5, the processing flow in the picking system according to the present embodiment will be described. FIG. 5 is a flowchart showing an example of processing in the picking system according to the first embodiment. In the flowchart shown in FIG. 5, the processing flow of the picking system performed for the picking instruction information for one cycle will be described.

As shown in FIG. 5, when the processing in the picking system is started, the terminal 60 receives the picking instruction information for one cycle created by the management device 90 from the management device 90 (step S10). The terminal 60 that has received the picking instruction information stores the picking instruction information in the storage unit 62. Then, the processing in the reading unit 64 (step S100) and the processing in the processing unit 65 (step S200) are repeated until one cycle is completed. These processes can be executed in parallel.

Figure 6:
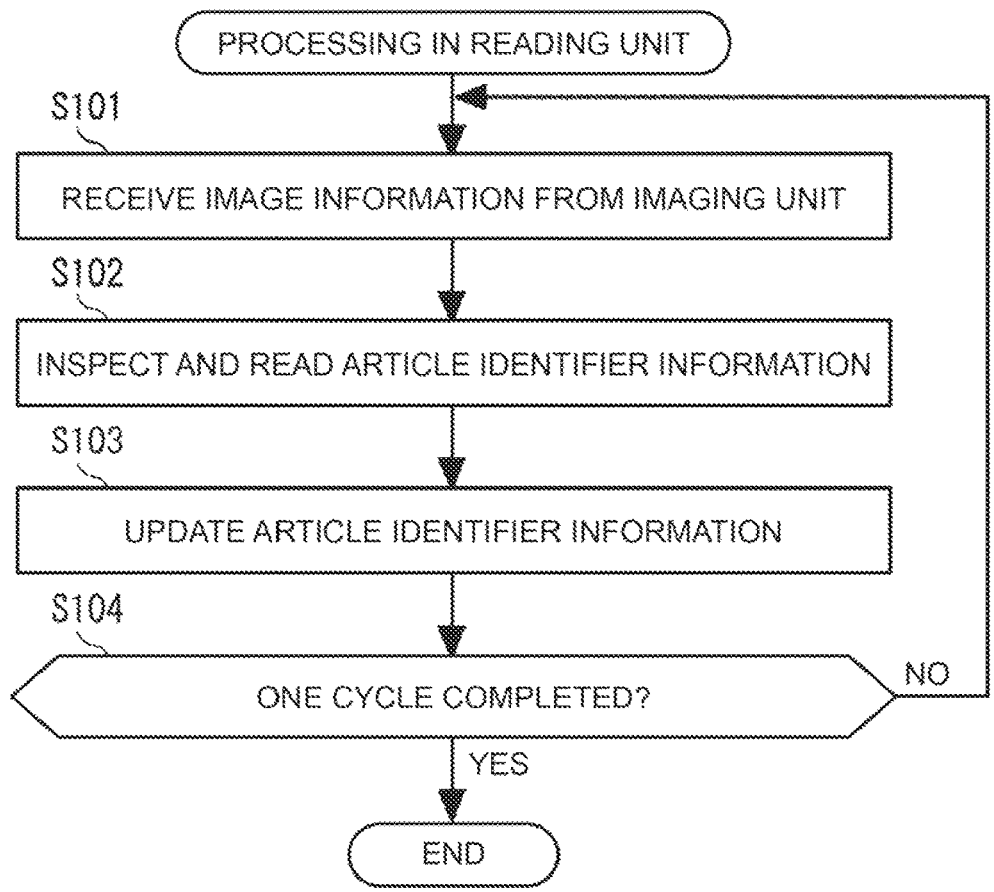
FIG. 6 is a flowchart showing details of step S100 of the flowchart of FIG. 5.

Therefore, first, with reference to FIG. 6, the processing flow in the reading unit 64 will be described in detail. FIG. 6 is a flowchart showing details of step S100 of the flowchart of FIG. 5. As shown in FIG. 6, in the processing of the reading unit 64 following step S10, first, the reading unit 64 receives the image information generated by the imaging unit 50 from the imaging unit 50 (step S101). The reading unit 64 then detects the code C1 of one or more inspection target articles W from the image information and reads one or more types of the article identifier information (step S102). Next, by sequentially transmitting the read article identifier information to the processing unit 65, the article identifier information is updated (step S103).

Then, when it is determined in the processing unit 65 that one cycle is completed (step S104: YES), the processing in the reading unit 64 ends. On the other hand, when it is not determined in the processing unit 65 that one cycle has been completed (step S104: NO), the process returns to step S101 and a series of processing in the reading unit 64 is repeated.

Figure 7:
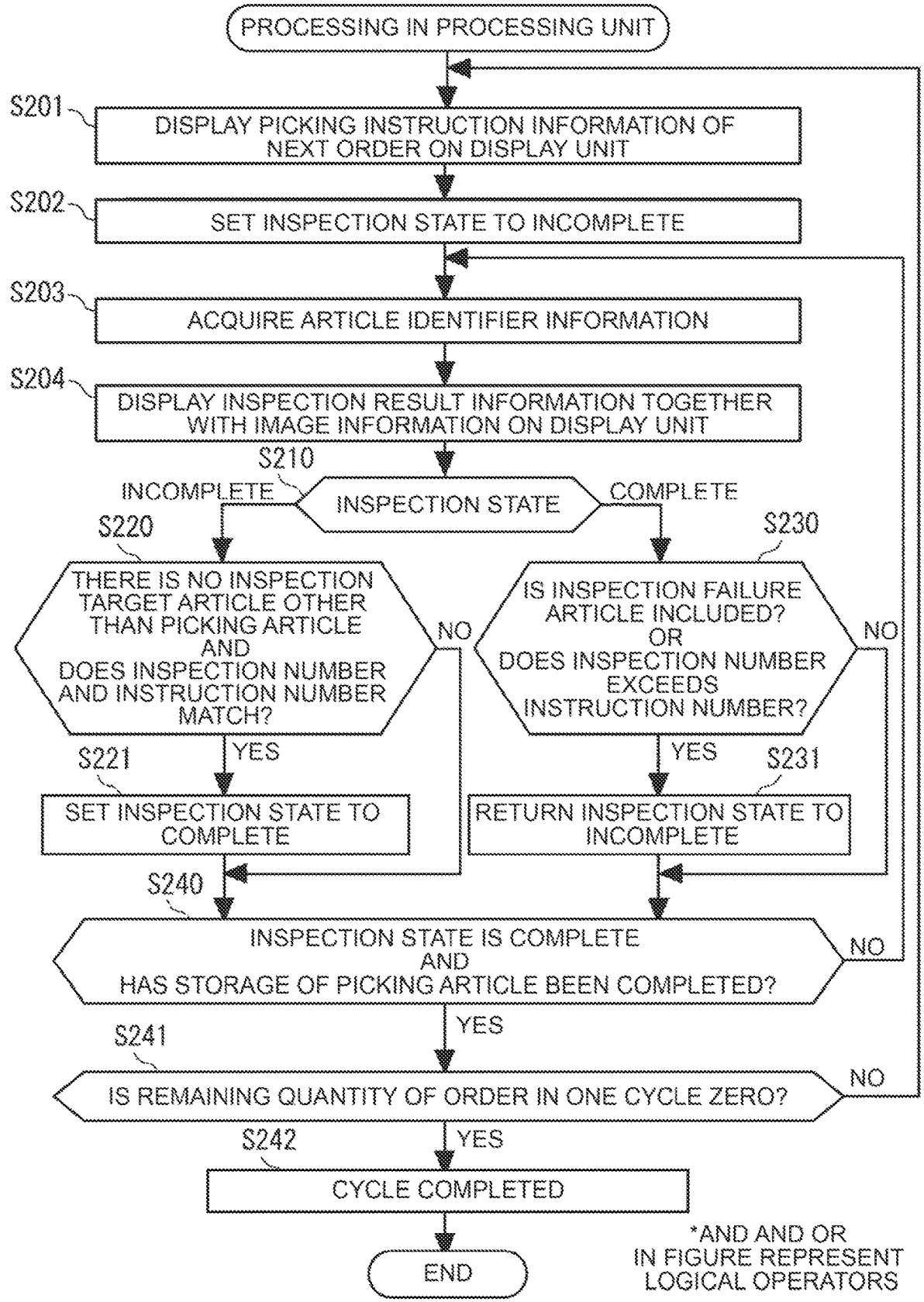
FIG. 7 is a flowchart showing details of step S200 of the flowchart of FIG. 5.

Subsequently, with reference to FIG. 7, the processing flow in the processing unit 65 will be described in detail. FIG. 7 is a flowchart showing details of step S200 of the flowchart of FIG. 5. As shown in FIG. 7, in the processing in the processing unit 65 following step S10, first, the processing unit 65 causes the display unit 63 to display the picking instruction information of the next order (step S201). At this time, the processing unit 65 performs processing of setting the inspection state to incomplete (step S202).

Next, one or more types of the article identifier information read by the reading unit 64 is acquired from the reading unit 64 (step S203). Then, the processing unit 65 causes the display unit 63 to display the inspection result information generated based on the result of collating the acquired article identifier information with the article management information read from the storage unit 62 together with the image information (step S204).

In generating the inspection result information, the processing according to the inspection state proceeds following step S204. First, when the inspection state is incomplete (step S210: Incomplete), the process proceeds to step S220. In step S220, an AND operation is performed. In step S220, it is determined whether both the condition that all the acquired article identifier information match the article management information of the picking article W1 and there is no inspection target article W other than the picking article W1, and the condition that the inspection number information and the instruction number information match are satisfied.

In step S220, when there is no inspection target article W other than the picking article W1 and the inspection number and the instruction number match (step S220: YES), the process proceeds to step S221 to perform processing to set the inspection state to complete. Then, the process proceeds to step S240. In step S220, when at least one of the condition that there is an inspection target article W other than the picking article W1 and the condition that the inspection number and the instruction number do not match is satisfied (step S220: NO), the process proceeds to step S240.

Meanwhile, when the inspection state is incomplete (step S210: Incomplete), the process proceeds to step S230. In step S230, an OR operation is performed. In step S230, it is determined whether at least one of the condition that the acquired article identifier information includes the inspection failure article W2 and the condition that the inspection number (inspection number information) exceeds the instruction number (instruction number information) is satisfied.

In step S230, when at least one of the condition that there is the inspection failure article W2 and the condition that the inspection number information exceeds the instruction number information is satisfied (step S230: YES), the process proceeds to step S231 to perform processing to return the inspection state to incomplete. Then, the process proceeds to step S240. In step S230, when there is no inspection failure article W2 and the inspection number information does not exceed the instruction number information (step S230: NO), the inspection state is maintained to complete and the process proceeds to step S240.

Subsequently, in step S240, an AND operation is performed to determine whether the inspection state is complete and the storage of the picking article W1 has been completed. The processing unit 65 can determine that the storage of the picking article W1 has been completed due to the detection of the opening/closing of the storage portion 10 or the fact that the total number information becomes zero. When the inspection state is complete and the storage of the picking article W1 has been completed in step S240 (step S240: YES), the process proceeds to step S241. In step S240, when at least one of the condition that the inspection state is incomplete and the condition that the storage of the picking article W1 is not completed is satisfied (step S240: NO), the process returns to step S203, and the processing of step S203 and subsequent steps is repeated until the inspection state is complete and the storage of the picking article W1 is completed.

In step 241, it is determined whether the remaining quantity of the order in one cycle is zero. The processing unit 65 can determine the remaining quantity of the order from the order remaining quantity information. In step S241, when the remaining quantity of the order (order remaining quantity information) in one cycle is zero (step S241: YES), the process proceeds to step S242. It is thus determined that the cycle is completed, and the processing in the processing unit 65 ends. In step S241, when the remaining quantity of the order (order remaining quantity information) in one cycle is one or more (step S241: NO), the process returns to step S201 to transition to the next order, and the series of processing in the processing unit 65 is repeated.

According to the above flow, the processing in the picking system according to the present embodiment is performed.

Figure 8:
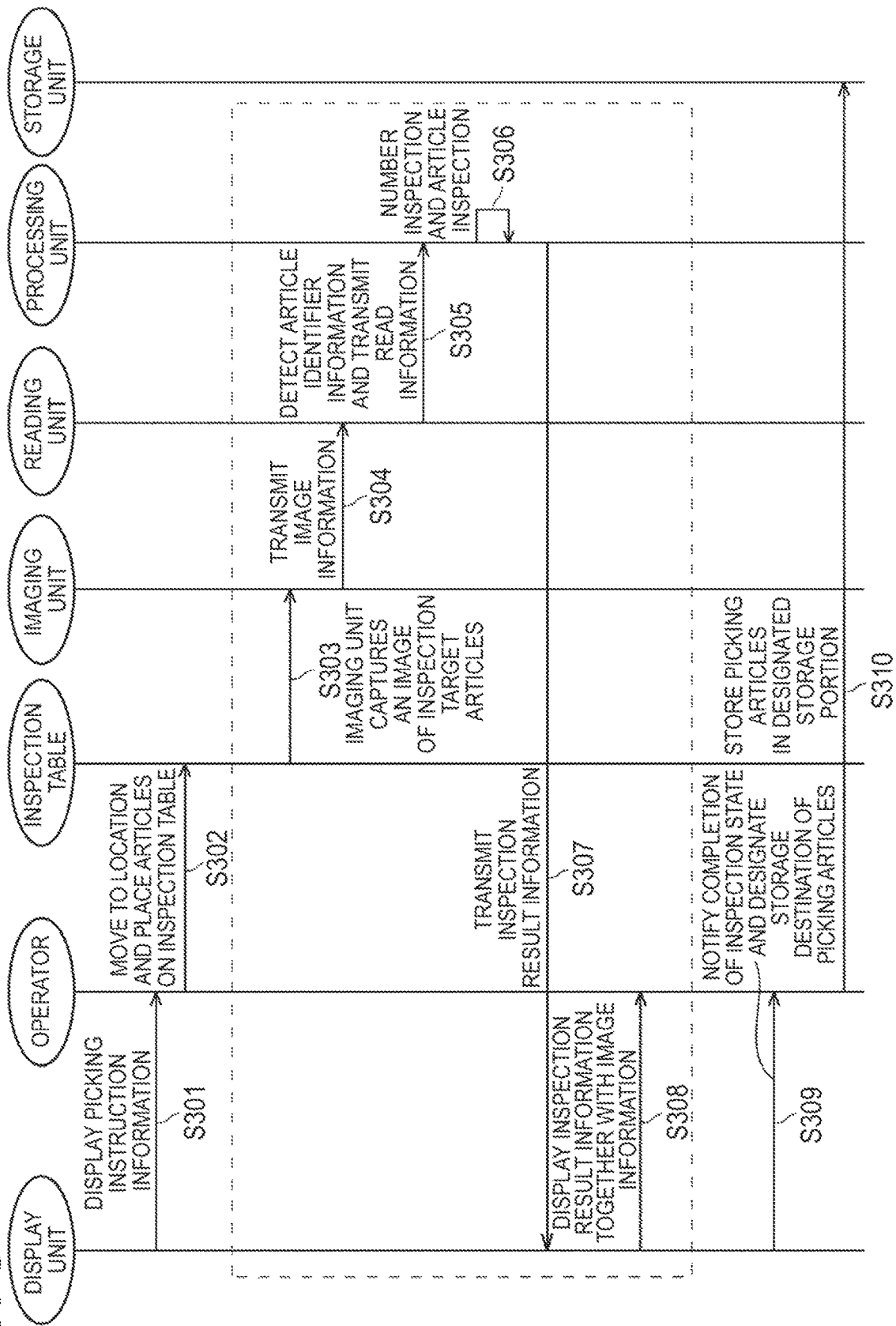
FIG. 8 is a sequence diagram showing a flow of picking operation of one order.

Next, with reference to FIG. 8, a flow of the picking operation using the picking system according to the present embodiment will be described. FIG. 8 is a sequence diagram showing a flow of the picking operation of one order. In describing the flow of the picking operation, screen examples of the display unit 63 will be described with reference to FIGS. 9 to 17.

In the screen examples of the display unit 63 shown in FIGS. 9 to 17, an image area for displaying the image information and a message is arranged on the left side, and an instruction information area for displaying the order information, the location information, the picking article information, the instruction number information, and the storage destination information included in the picking operation instruction information is arranged on the right side. Further, in the instruction information area, the inspection number information is displayed along with the instruction number information.

FIGS. 9 to 17 show an example of a screen in which the picking operation corresponding to the 10th order out of 30 orders, which is the total quantity of the orders in one cycle, is performed. In this order, the instruction for the picking operation is to take out "3" articles with the article number of "XXXXX-XXXXX" from the location of "XX-XX-XX" and store the articles in the storage portion "A" (10*a*) that is the storage destination.

As shown in FIG. 8, the terminal 60 to which the picking instruction information is input displays the picking instruction information on the display unit 63 (step S301). The operator performs the picking operation according to the picking instruction information displayed on the display unit 63.

Here, FIG. 9 is a diagram showing a screen example of the display unit at the start of the picking operation. As shown in FIG. 9, when starting the picking operation for one order, the order information (for example, the order "10/30"), the location information (for example, the location "XX-XX-XX"), the picking article information (for example, the article number "XXXXX-XXXXX"), the instruction number information (for example, the instruction number "3"), the inspection number information (for example, the inspection number "0"), and the storage destination information (for example, the storage destination "A") are displayed on the screen G, along with a message to the operator "Please go to instructed location and read code". The storage destination information is, for example, information in which a color is added in the frame in which "A" is displayed among the storage destinations "A", "B", "C", and "D".

Subsequently, as shown in FIG. 8, the operator confirms the location information, the picking article information, and the instruction number information displayed on the display unit 63, and pushes the picking trolley 1 to move to the instructed location in the warehouse. Then, the operator takes out the articles from the shelf at the instructed location one by one or at the same time, and sequentially places the taken out articles on the inspection table 30 (step S302). The articles placed on the inspection table 30 is the inspection target articles W.

Subsequently, the operator adjusts the position of the imaging unit 50 while visually confirming the positions of the codes C1 of the inspection target articles W displayed on the display unit 63 as necessary so that each code C1 of all the inspection target articles W on the inspection table 30 is within the imaging range of the imaging unit 50. The imaging unit 50 captures an image of the inspection target articles W on the inspection table 30 and generates the image information including the codes C1 (step S303). Then, the imaging unit 50 sequentially transmits the generated image information to the reading unit 64 (step S304).

Each time the reading unit 64 receives the image information from the imaging unit 50, the reading unit 64 detects the codes C1 of the inspection target articles W from the image information, reads the article identifier information, and sequentially transmits the read article identifier information to the processing unit 65 (step S305).

Each time the processing unit 65 acquires the article identifier information from the reading unit 64, the processing unit 65 performs article inspection to collate whether the inspection target articles W are the picking articles W1 based on the acquired article identifier information and the article management information read from the storage unit 62, and performs the number inspection to count the inspection target articles W determined as the picking articles W1 (step S306).

Here, for example, when the order under operation requires the divided scan, the plurality of inspection target articles W is divided into several groups and the flow of steps S303 to S306 are repeated to perform the picking operation.

As a specific operation, after the number inspection and the article inspection (step S306) in the processing unit 65 are completed for the previous group, the operator presses the "Continue" button in order to continue the process of the number inspection and the article inspection. The operator removes the inspection target articles W of the previous group from the inspection table 30, and then places the inspection target articles W of the next group on the inspection table 30. Along with this, the flow of steps S303 to S306 proceeds again. By repeating this, all the codes C1 of the plurality of the inspection target articles W can be included in the plurality of types of the image information.

The processing unit 65 generates the inspection result information obtained by accumulating the results of performing the number inspection and the article inspection for all the article identifier information read from the plurality of types of the image information. In such a case where the divided scan is applied to the picking operation, when the accumulated inspection number information and the instruction number information match, the processing unit 65 performs processing of setting the inspection state to complete.

After the "Continue" button is touched, the "Continue" button is invalidated during the operation of removing the inspection target articles W of the previous group from the inspection table 30. When the "Continue" button is invalidated, the processing of the number inspection and the article inspection in the processing unit 65 is stopped. The invalidation of the "Continue" button is continued until the storage of the picking articles W1 is completed (until the storage portion 10 is opened and closed, or until the total number information becomes zero). When the storage of the picking articles W1 is completed, the "Continue" button is validated, and the processing of the number inspection and the article inspection in the processing unit 65 is automatically restarted accordingly. In this way, by temporarily invalidating the "Continue" button, it is possible to suppress a counting error that may occur due to touching the "Continue" button more than necessary.

Following step S306, the inspection result information generated by the processing unit 65 is sequentially transmitted to the display unit 63 (step S307). The display unit 63 notifies the operator of the inspection results of the inspection target articles W by displaying the inspection result information together with the image information (step S308).

Figure 10:
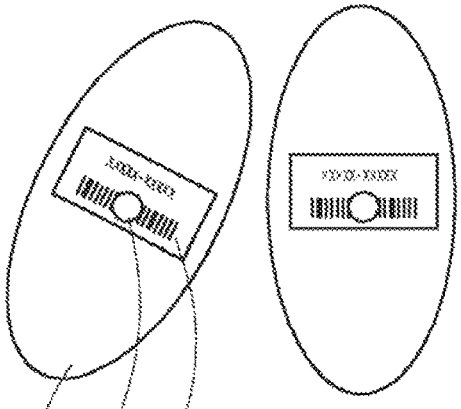
FIG. 10 is a diagram showing a screen example of the display unit during the picking operation.

Here, FIG. 10 is a diagram showing a screen example of the display unit during the picking operation. FIG. 10 shows a screen G when two inspection target articles W corresponding to the picking articles W1 are placed on the inspection table 30 with respect to the instruction number "3". As shown in FIG. 10, when the inspection target articles W are arranged within the imaging range of the imaging unit 50, the message "Please read code" is displayed on the screen G together with the image information. Then, when the processing unit 65 determines that the two inspection target articles W included in the image information are both the picking articles W1, the inspection number "2" is displayed as the inspection number information on the screen G, and the gray first marker M1 is superimposed and displayed at each position overlapping the code C1.

In the screen example shown in FIG. 10, in order to suppress the operator from storing the picking article W1 in the storage portion 10 at the timing when the inspection state is incomplete, no color is given in the frame in which "A" is displayed as the storage destination information. However, if necessary, even when the inspection state is incomplete, it is possible to display the storage destination information with such a color change.

The flow of steps S303 to S308 described above is repeated until the processing unit 65 determines that the picking is completed and the inspection state is complete.

Subsequently, as shown in FIG. 8, when the processing unit 65 performs processing of setting the inspection state to complete, the display unit 63 displays the inspection result information indicating that the inspection state is complete and performs a voice notification. As a result, the operator is notified that the inspection state is complete. The display unit 63 also displays the storage destination information indicating the storage destination of the picking articles W1 and performs the voice output to designate the storage destination of the picking articles W1 to the operator (step S309).

Further, in step S309, the inspection result information at the time of performing the processing of setting the inspection state to complete is associated with the picking instruction information and the image information, and stored in the storage unit 62 as the inspection completion image. However, when the processing of returning the inspection state from complete to incomplete is performed, the inspection completion image immediately before the processing is performed is deleted from the storage unit 62. When the divided scan is performed, all the images including the entire number of the codes C1 of the inspection target articles W to be subject to the divided scan are stored in the storage unit 62 as the inspection completion images. In the divided scan, as the image deleted when the processing of returning the inspection state from complete to incomplete is performed, the inspection completion image on and after the start of the processing of the number inspection and the article inspection is deleted, while going back to the timing when the processing of the number inspection and the article inspection is started.

In this way, the inspection completion image stored in the storage unit 62 is periodically transmitted to the management device 90 and stored in the storage unit of the management device 90. Alternatively, the inspection completion image stored in the storage unit 62 may be transmitted to the management device 90 at anytime. As a specific example of the inspection completion image, the screen G shown in FIG. 11 can be given.

Figure 11:
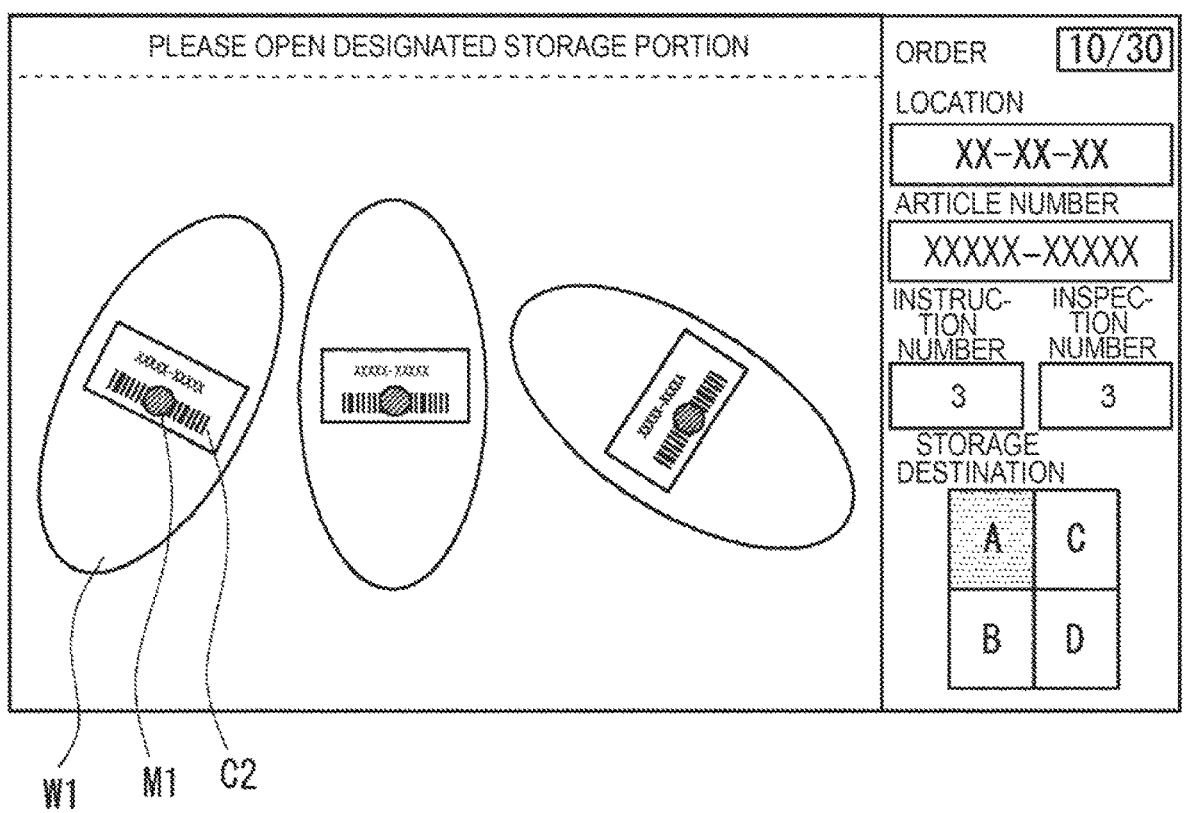
FIG. 11 is a diagram showing a screen example of the display unit that instructs a storage destination of picking articles.

FIG. 11 is a diagram showing a screen example of the display unit that instructs the storage destination of the picking articles. FIG. 11 shows a screen G when three inspection target articles W corresponding to the picking articles W1 are placed on the inspection table 30 with respect to the instruction number "3". As shown in FIG. 11, when the processing unit 65 determines that all three inspection target articles W included in the image information are the picking articles W1, the inspection number "3" is displayed as the inspection number information on the screen G, and the first marker M1 that has been switched from gray to green is superimposed and displayed at each position overlapping the code C1. The message "Please open designated storage portion" is displayed on the screen G, and a color is added in the frame in which the storage destination "A" is displayed.

Figure 12:
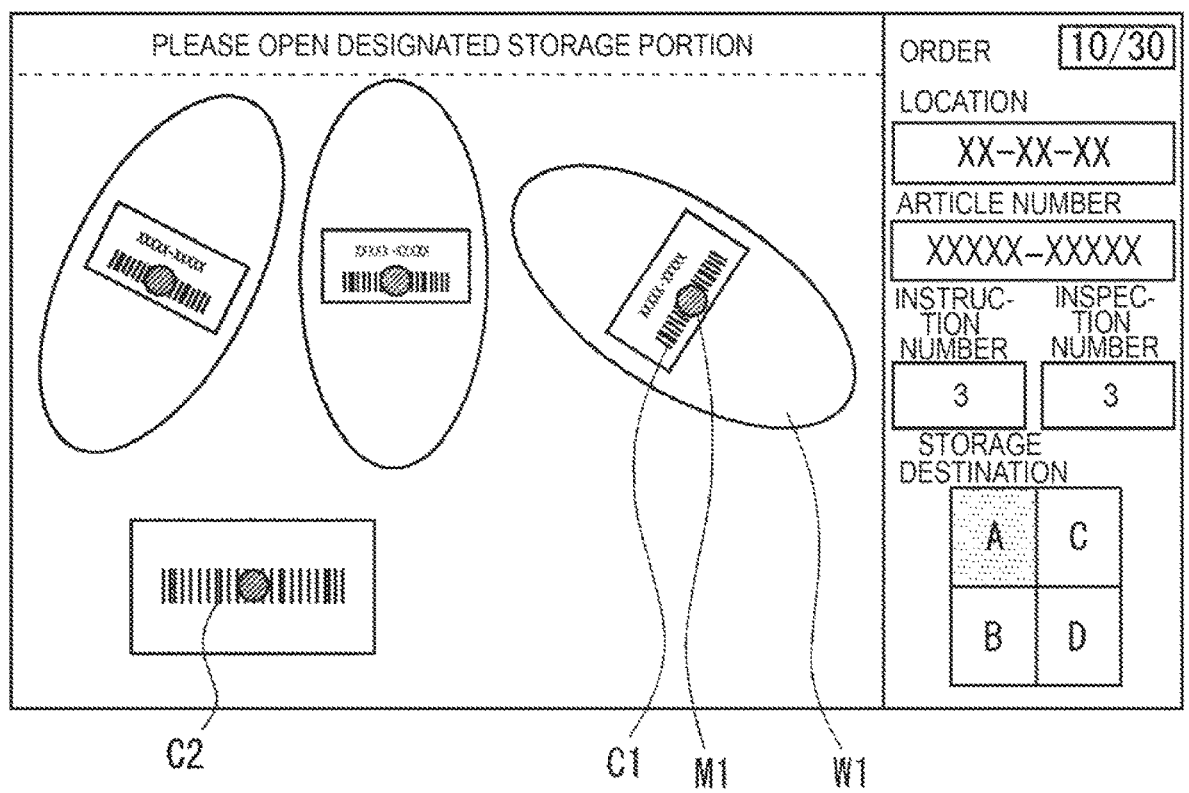
FIG. 12 is a diagram showing a screen example of the display unit when another code is read together with codes of inspection target articles.

FIG. 12 is a diagram showing a screen example of the display unit when another code is read together with the codes of the inspection target articles. FIG. 12 shows a screen G in which, after the inspection state is set to complete in step S309, the imaging unit 50 captures an image of a label on which a code C2 different from the codes C1 of the inspection target articles W is printed, together with the three inspection target articles W corresponding to the picking articles W1.

The label on which the code C2 is printed is, for example, a delivery label for indicating information related to the picking operation performed this time (for example, information included in the picking instruction information). Even when the codes C1 and the code C2 are read at the same time, the codes C1 and C2 can be read in the same flow as in the case of reading the code C1 given to the article.

Specifically, the reading unit 64 simultaneously reads the information of the codes C1 and C2 from the image information generated by imaging the codes C1 and C2 by the imaging unit 50. Then, regarding the code C2, the processing unit 65 can use the information read from the code C2 to determine whether the delivery label is the correct delivery label corresponding to the picking operation performed this time. In this case, the processing unit 65 reads necessary information from the storage unit 62 and collates the information with the information of the code C2 to determine whether the delivery label is correct.

When the processing unit 65 determines that the delivery label is the correct delivery label, for example, the green first marker M1 is superimposed on the position of the image information overlapping the code C2 and displayed on the display unit 63. On the other hand, when the processing unit 65 determines that the delivery label is an incorrect delivery label, a message such as "Delivery label is incorrect" is displayed on the screen G to notify the operator of the error.

Following step S309, as shown in FIG. 8, the operator opens the designated storage portion 10 and puts the picking article W1 placed on the inspection table 30 in the designated storage portion 10 according to the storage destination information displayed on the display unit 63. Then, when all the picking articles W1 on the inspection table 30 are put into the storage portion 10, the operator closes the storage portion 10 and returns the storage portion 10 to the original state. As a result, the picking articles W1 are stored in the storage portion 10 (step S310).

In step S310, the detection unit that has detected that the storage portion 10a has changed from the open state to the closed state again with the storage of the picking article W1 transmits the detection result to the terminal 60. Until the storage portion 10a is closed again, the processing unit 65 continues to update the inspection result information via the reading unit 64 from the image information generated by the imaging unit 50. During this time, the processing unit 65 monitors the inspection result information and performs the processing of returning the inspection state from complete to incomplete according to the flow described with reference to FIG. 7.

Here, FIG. 13 is a diagram showing a screen example of the display unit when the picking is completed. As shown in FIG. 13, when the door of the storage portion 10a is closed, the message "Picking completed" is displayed on the screen G based on the detection result of the detection unit. After that, the process transitions to the next order. When a normal picking operation that matches the instruction content of the order is performed, the picking operation of one order is performed as described above.

In contrast, in the flow shown in FIG. 8, a case where an abnormal picking operation that does not match the instruction content of the order is performed will be described.

Figure 14:
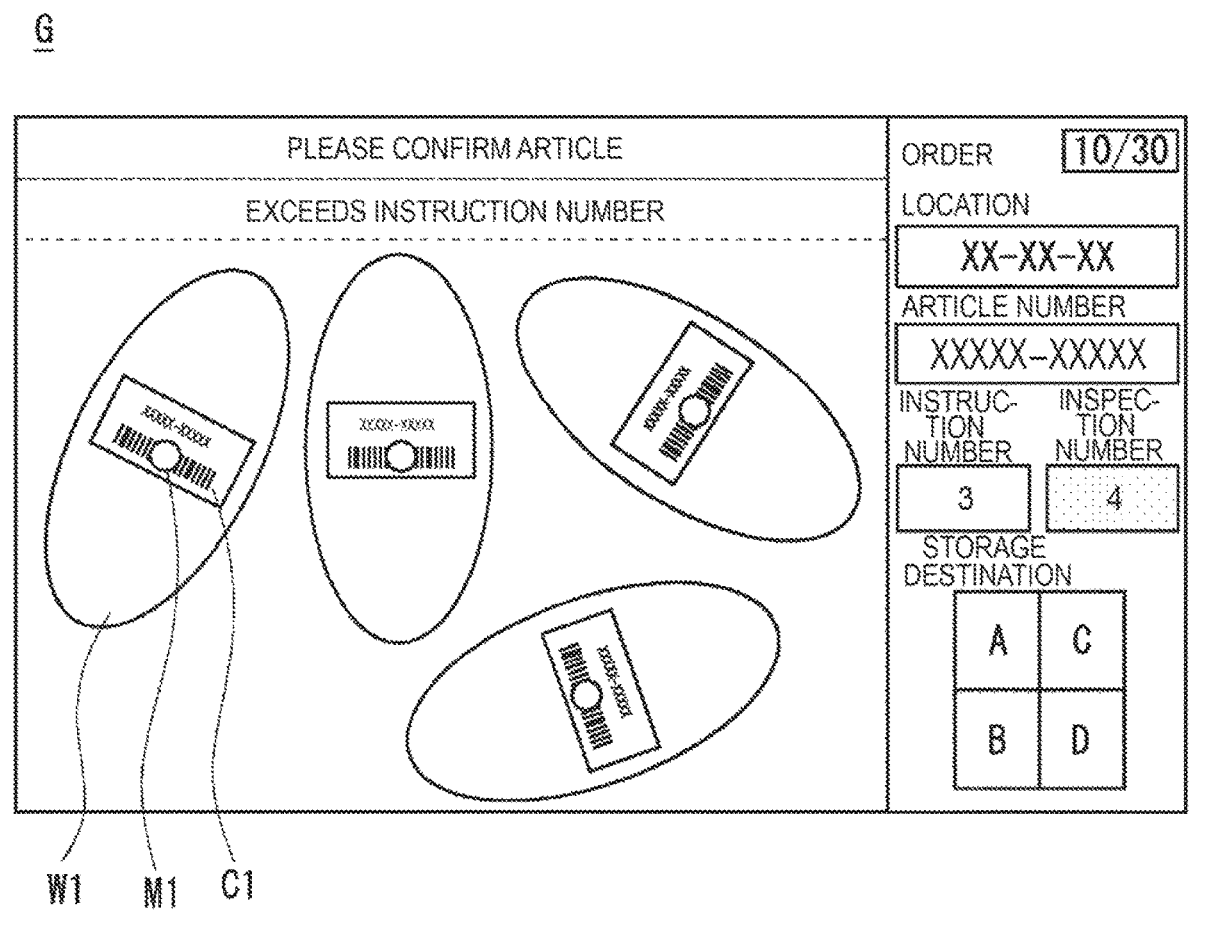

First, FIG. 14 is a diagram showing a screen example of the display unit when there is an excess of the picking articles. FIG. 14 shows a screen G when four inspection target articles W corresponding to the picking articles W1 are placed on the inspection table 30 with respect to the instruction number "3". As shown in FIG. 14, when the processing unit 65 determines that all four inspection target articles W included in the image information are the picking articles W1, the gray first marker M1 is superimposed and displayed at each position overlapping the code C1. The inspection number "4" is displayed as the inspection number information, and a color is given in the frame in which the inspection number "4" is displayed. Along with these, the messages "Please confirm articles" and "Exceeds instruction number" are displayed on the screen G, and a warning sound notifying the abnormality is emitted.

For example, when one extra picking article W1 is added on the inspection table 30 after the processing unit 65 sets the inspection state to complete in step S309 above, the completion of the inspection state is canceled and returns to incomplete. After that, when one of the four picking articles W1 is removed from the inspection table 30 by the operator, the instruction number and the inspection number match, so that the inspection state is set to complete again.

Subsequently, FIG. 15 is a diagram showing a screen example of the display unit when there is an inspection failure article. FIG. 15 shows a screen G when two inspection target articles W corresponding to the picking articles W1 and one inspection target article W corresponding to the inspection failure article W2 are placed on the inspection table 30 with respect to the instruction number "3". As shown in FIG. 15, when the processing unit 65 determines the type of the three inspection target articles W included in the image information, the gray first marker M1 is superimposed and displayed at each position overlapping the codes C1 of the two inspection target articles W corresponding to the picking articles W1. In addition, a red second marker M2 is superimposed and arranged at a position overlapping the code C1 of the one inspection target article W corresponding to the inspection failure article W2.

In this case, the inspection number "2" is displayed as the inspection number information, and a color is given in the frame in which the inspection number "2" is displayed. Along with these, the messages "There is inspection failure article", "Location ZZ-ZZ-ZZ", and "Article number ZZZZZ-ZZZZZ" are displayed on the screen G, and a warning sound notifying the abnormality is emitted. The messages "Location ZZ-ZZ-ZZ" and "Article number ZZZZZ-ZZZZZ" are information related to the inspection failure article W2.

Figure 16:
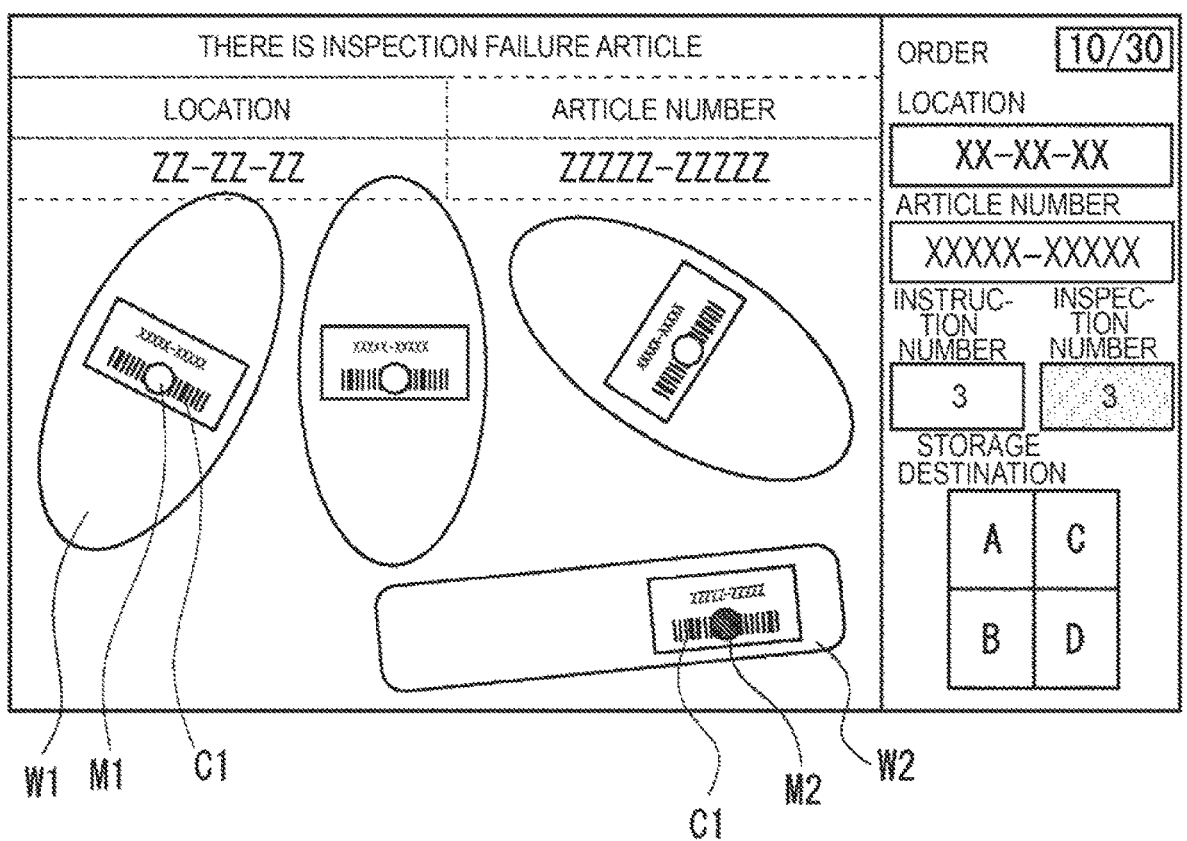
FIG. 16 is a diagram showing another screen example of the display unit when there is an inspection failure article.

Subsequently, FIG. 16 is a diagram showing another screen example of the display unit when there is an inspection failure article. FIG. 16 shows a screen G when three inspection target articles W corresponding to the picking articles W1 and one inspection target article W corresponding to the inspection failure article W2 are placed on the inspection table 30 with respect to the instruction number "3". As shown in FIG. 16, when the processing unit 65 determines the type of the four inspection target articles W included in the image information, the gray first marker M1 is superimposed and displayed at each position overlapping the codes C1 of the three inspection target articles W corresponding to the picking articles W1. In addition, a red second marker M2 is superimposed and arranged at a position overlapping the code C1 of the one inspection target article W corresponding to the inspection failure article W2.

In this case, the inspection number "3" is displayed as the inspection number information, but since a color is given in the frame in which the inspection number "3" is displayed, the operator can recognize that there has been an operation error. Along with these, the messages "There is inspection failure article", "Location ZZ-ZZ-ZZ", and "Article number ZZZZZ-ZZZZZ" are displayed on the screen G, and a warning sound notifying the abnormality is emitted.

Figure 17:
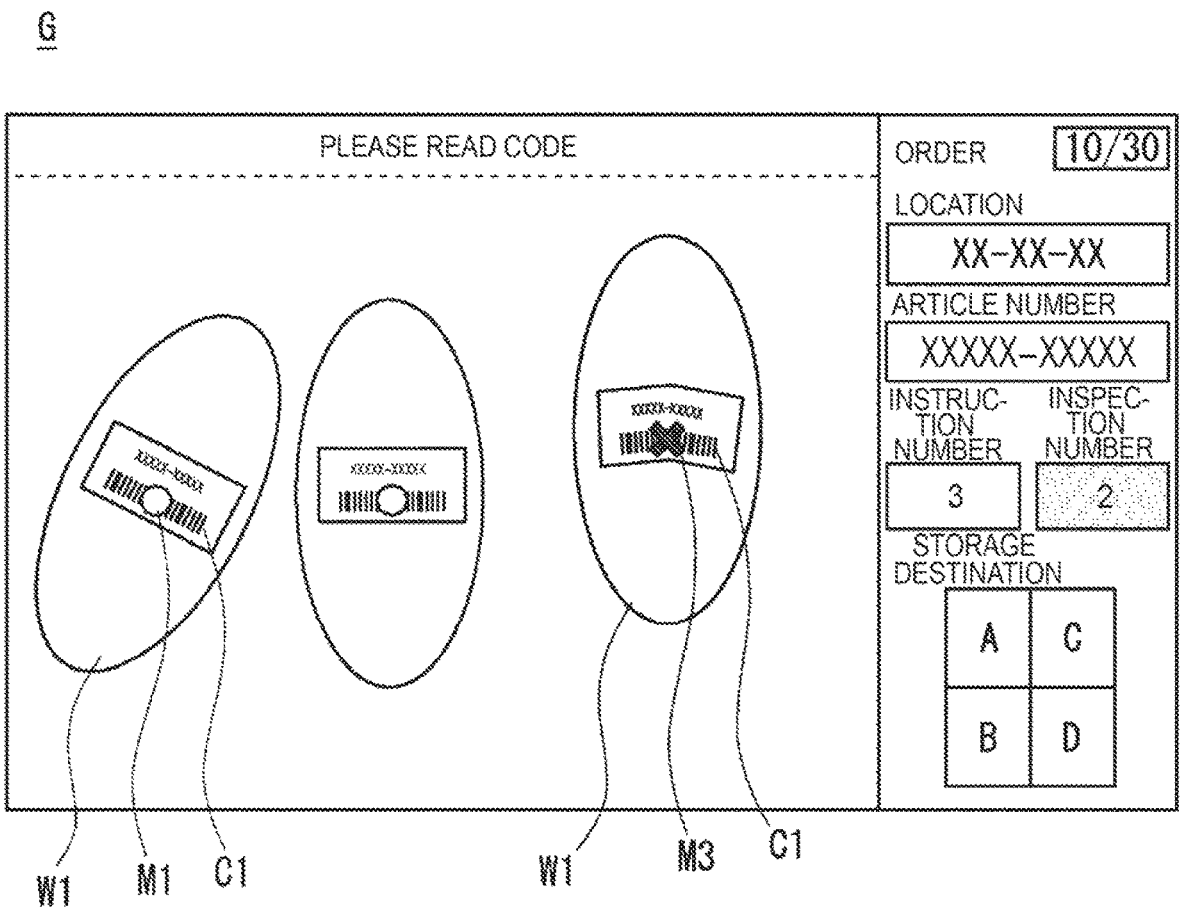
FIG. 17 is a diagram showing a screen example of the display unit when there is an undecipherable article.

Subsequently, FIG. 17 is a diagram showing a screen example of the display unit when there is an undecipherable article. FIG. 17 shows a screen G when two inspection target articles W corresponding to the picking articles W1 and one inspection target article W corresponding to the undecipherable article W3 are placed on the inspection table 30 with respect to the instruction number "3". As shown in FIG. 17, when the processing unit 65 determines the type of the three inspection target articles W included in the image information, the gray first marker M1 is superimposed and displayed at each position overlapping the codes C1 of the two inspection target articles W corresponding to the picking articles W1. In addition, a red third marker M3 is superimposed and arranged at a position overlapping the code C1 of the one inspection target article W corresponding to the undecipherable article W3.

In this case, the inspection number "2" is displayed as the inspection number information, and a color is given in the frame in which the inspection number "2" is displayed. At the same time, the message "Please read code" is displayed on the screen G.

As a result, the operator who recognizes that there is an undecipherable article W3 corrects, for example, the deformation of the code C1 and continues the imaging by the imaging unit 50. Alternatively, the operator uses the scanner unit 70 to read the code C1 of the undecipherable article W3.

As described above, in the picking operation using the picking trolley 1, the picking system, and the picking program according to the present embodiment, the operator can automatically perform the number inspection and the article inspection of articles with a simple operation of placing the instructed articles on the inspection table 30 in the instructed quantity. By automatically performing the number inspection and the article inspection, it is possible to suppress counting errors that may occur due to scan omissions, multiple scans, and the like. Since the operator can easily confirm the inspection result on the screen G, the operator can quickly move to the next operation.

For example, in the method of reading the article information of individual articles by using a scanner as in JP 2010-52845 A, the operator needs to perform a series of operations of placing the article on the inspection table, picking up the scanner, scanning the article information one by one, and returning the scanner to its original position. Such an operation imposes a heavy burden on the operator especially when it is necessary to scan a large amount of articles, and there is an issue that a counting error may occur due to scan omissions, multiple scans, and the like.

In view of the above issue, it is conceivable to acquire the article information from the image using a camera or the like, but since it is difficult to recognize the timing of the completion of placement of the article, a method may be adopted where the operator presses an imaging button when the placement of the article is completed. However, it is troublesome to press the imaging button each time, and it takes extra operation time. In view of this, according to the present embodiment, since the inspection is properly completed only by placing the article, it is not necessary to press the imaging button, and at the same time, operation errors including excess articles and inspection failure articles can be minimized.

By using the picking trolley 1, the picking system, and the picking program according to the present embodiment, a plurality of types of the article information can be read simultaneously from the image information, so that even in the picking operation of picking a large amount of articles, the burden on the operator can be reduced. Therefore, the picking operation can be performed efficiently.

Further, in the picking trolley 1, the picking system, and the picking program according to the present embodiment, when the processing unit 65 sets the inspection state to complete, the operator is notified of the storage destination of the picking article W1. As a result, the operator can confirm the storage destination at the timing of sorting, so that sorting errors by the operator can be reduced.

Further, the picking trolley 1, the picking system, and the picking program according to the present embodiment returns the inspection state to incomplete upon recognizing that an extra article has been placed on the inspection table 30 after the processing unit 65 has set the inspection state to complete, making it possible to notify the operator of an operation error. However, when the number of articles on the inspection table 30 decreases after the processing unit 65 sets the inspection state to complete, the inspection state is maintained to complete. With such a configuration, it is possible to suppress scan omissions, contamination of the inspection failure articles W2, and the like.

Further, in the picking trolley 1, the picking system, and the picking program according to the present embodiment, the inspection result information includes a marker indicating the type of the inspection target article W. The marker is arranged in the vicinity of the corresponding inspection target article W and displayed on the display unit 63. As a result, the operator can easily grasp the type, position, inspection state, and the like of the inspection target article W.

Further, in the picking trolley 1, the picking system, and the picking program according to the present embodiment, the inspection result information at the time when the processing unit 65 sets the inspection state to complete is associated with the picking instruction information and the image information and stored in the storage unit 62 as the inspection completion image. According to such a configuration, it is possible to extract a desired image from the stored inspection completion images for all the picking operations performed in the past to confirm past operation contents. Since the inspection completion image includes not only the picking instruction information and the inspection number information but also the image information showing the appearance, position, etc. of the articles, it is possible to verify the operation content based on a larger amount of information. The desired image can be searched using various data such as a cycle number, an order number, and an imaging date and time.

Further, in the picking trolley 1, the picking system, and the picking program according to the present embodiment, when the article identifier information cannot be obtained from the image information due to a reading error or the like, the article identifier information of the inspection target article W can be obtained by using the scanner unit 70. According to such a configuration, the picking operation can be performed more efficiently.

Further, the imaging unit 50 applied to the picking trolley 1, the picking system, and the picking program according to the present embodiment is provided so as to be movable with one or more degrees of freedom. As a result, the imaging direction and the imaging position of the imaging unit 50 can be changed according to the direction of the code C1 to be read, so that the picking operation can be performed more efficiently.

Further, the bottom portion of the picking trolley 1 is composed of the pedestal portion 43 provided with the wheels 42 on the lower surface. As a result, the picking trolley 1 can carry the articles.

Figure 18:
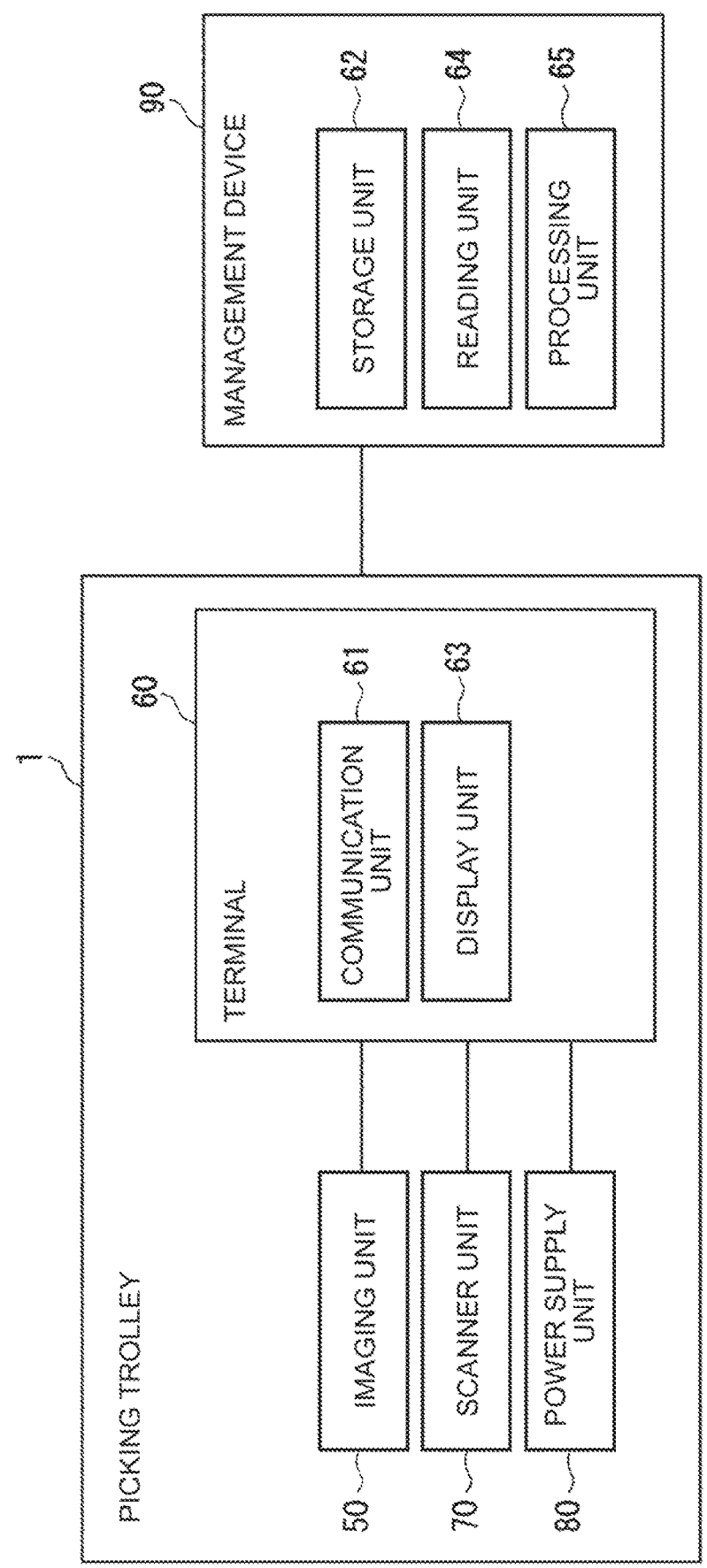
FIG. 18 is a functional block diagram showing another configuration of the picking system.

Note that the present disclosure is not limited to the above embodiments and can be appropriately modified without departing from the spirit. For example, a part of the functional blocks of the picking system according to the above embodiment may be realized by using the management device 90. FIG. 18 is a functional block diagram showing another configuration of the picking system. In the configuration example shown in FIG. 18, the management device 90 includes the storage unit 62, the reading unit 64, and the processing unit 65. The storage unit 62, the reading unit 64, and the processing unit 65 are connected to the communication unit 61 via a network and can communicate with the display unit 63.

Further, by utilizing the function of the "Continue" button described in the above embodiment, the function can be applied to an operation such as an inventory operation in which only the number of articles in stock is calculated. In this case, the instruction quantity is not set in the picking instruction information, and the processing of the number inspection and the article inspection is continuously performed until the counting of all the articles for which the inventory quantity is to be confirmed is completed. In addition, the configuration may be such that the calculation is performed by touching the completion button for completing the processing of the number inspection and the article inspection.

Further, when the program executed in the picking trolley 1 and the picking system according to the above embodiment is read into a computer, the program includes a group of commands (or a software code) for causing the computer to perform one or more functions described in the embodiment. The program may be stored in a non-transitory computer-readable medium or a tangible storage medium. Examples of the non-transitory computer-readable medium or the tangible storage medium include, but are not limited to, a RAM, a ROM, a flash memory, a solid-stated drive (SSD) or other memory technologies, a compact disc read-only memory (CD-ROM), a digital versatile disc (DVD), Blu-ray (registered trademark) disc, or other optical disc storages, and a magnetic cassette, a magnetic tape, a magnetic disc storage or other magnetic storage devices. The program may be transmitted on a transitory computer-readable medium or a communication medium. Examples of the transitory computer-readable medium or the communication medium include, but are not limited to, electrical, optical, acoustic, or other forms of propagating signals.

What is claimed is:

1. A picking trolley comprising:
    a storage shelf portion on which a storage portion for storing a picking article is placed;
    an inspection table on which at least one inspection target article is temporarily placed;
    an imaging unit that captures an image of the inspection target article placed on the inspection table and generates image information;
    a reading unit that reads article information that specifies the inspection target article from the image information;
    a storage unit that stores picking instruction information including the article information that specifies the picking article and instruction number information that indicates a quantity of the picking article to be picked;
    a processing unit that collates the article information of the inspection target article with the article information of the picking article read from the storage unit and generates inspection result information indicating whether the inspection target article corresponds to the picking article; and
    a display unit that displays the picking instruction information, the image information, and the inspection result information, wherein:
    the inspection result information includes inspection number information obtained by counting, as the picking article, the inspection target article including the article information matching the article information of the picking article; and
    the processing unit determines that picking is completed when there is no inspection failure article that is the inspection target article including article information that does not match the article information of the picking article, there is no undecipherable article that is the inspection target article including article information that is unable to be read normally, and the inspection number information and the instruction number information match.

2. The picking trolley according to claim 1, wherein when the processing unit determines that the picking is completed, the processing unit causes the display unit to display storage destination information indicating the storage portion that is a storage destination of the picking article.

3. The picking trolley according to claim 1, wherein after determining that the picking is completed, the processing unit redetermines that the picking is incomplete when the inspection number information exceeds the instruction number information.

4. The picking trolley according to claim 1, wherein the inspection result information includes a first marker that indicates that the inspection target article is the picking article and that is superimposed on a position of the image information related to the picking article to be displayed on the display unit.

5. The picking trolley according to claim 1, wherein the inspection result information includes a second marker that indicates that the inspection target article is the inspection failure article and that is superimposed on a position of the image information related to the inspection failure article to be displayed on the display unit.

6. The picking trolley according to claim 1, wherein the inspection result information includes a third marker that indicates that the inspection target article is the undecipherable article and that is superimposed on a position of the image information related to the undecipherable article to be displayed on the display unit.

7. The picking trolley according to claim 1, wherein the storage unit stores the inspection result information at a time when the processing unit determines that the picking is completed in association with the picking instruction information and the image information.

8. The picking trolley according to claim 1, wherein the processing unit collates the article information of the inspection target article read by a scanner unit that reads the article information of the inspection target article with the article information of the picking article read from the storage unit to generate the inspection result information.

9. The picking trolley according to claim 1, wherein the imaging unit is provided via an imaging movable unit that gives one or more degrees of freedom to the imaging unit.

10. The picking trolley according to claim 1, further comprising a pedestal portion provided with wheels on a lower surface, the storage shelf portion and the inspection table being provided above the pedestal portion.

11. A picking system comprising:
    a storage shelf portion on which a storage portion for storing a picking article is placed;
    an inspection table on which at least one inspection target article is temporarily placed;
    an imaging unit that captures an image of the inspection target article placed on the inspection table and generates image information;
    a reading unit that reads article information that specifies the inspection target article from the image information;
    a storage unit that stores picking instruction information including the article information that specifies the picking article and instruction number information that indicates a quantity of the picking article to be picked;
    a processing unit that collates the article information of the inspection target article with the article information of the picking article read from the storage unit and generates inspection result information indicating whether the inspection target article corresponds to the picking article; and
    a display unit that displays the picking instruction information, the image information, and the inspection result information, wherein:
    the inspection result information includes inspection number information obtained by counting, as the picking article, the inspection target article including the article information matching the article information of the picking article; and
    the processing unit determines that picking is completed when there is no inspection failure article that is the inspection target article including article information that does not match the article information of the picking article, there is no undecipherable article that is the inspection target article including article information that is unable to be read normally, and the inspection number information and the instruction number information match.

12. The picking system according to claim 11, further comprising a management device that generates the picking instruction information and manages a picking operation, and a communication unit connected via a network.

13. The picking system according to claim 11, wherein the reading unit and the processing unit are connected to the display unit via a network.

14. A picking program comprising:

a storing step for storing, by a storage unit, picking instruction information including article information that specifies a picking article and instruction number information that indicates a quantity of the picking article to be picked;

an instructing step for displaying the picking instruction information on a display unit;

an imaging step for generating image information by an imaging unit that captures an image of at least one inspection target article placed on an inspection table;

a reading step for reading article information that specifies the inspection target article from the image information;

an inspection processing step for collating the article information of the inspection target article with the article information of the picking article read from the storage unit and generating inspection result information indicating whether the inspection target article corresponds to the picking article; and a displaying step for displaying the inspection result information on the display unit together with the image information, wherein;

the inspection result information includes inspection number information obtained by counting, as the picking article, the inspection target article including the article information matching the article information of the picking article; and in the inspection processing step, a computer is caused to execute a process of determining that picking is completed when there is no inspection failure article that is the inspection target article including article information that does not match the article information of the picking article, there is no undecipherable article that is the inspection target article including article information that is unable to be read normally, and the inspection number information and the instruction number information match.

15. The picking program according to claim 14, wherein the reading step and the inspection processing step include a step of communicating with the display unit connected via a network.

* * * * *